(12) United States Patent
Cox, III

(10) Patent No.: US 9,894,192 B2
(45) Date of Patent: *Feb. 13, 2018

(54) CASE WITH INTERCHANGEABLE BACK PLATE

(71) Applicant: James L. Cox, III, Dallas, TX (US)

(72) Inventor: James L. Cox, III, Dallas, TX (US)

(73) Assignee: James L. Cox, III, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/845,560

(22) Filed: Sep. 4, 2015

(65) Prior Publication Data

US 2016/0072933 A1    Mar. 10, 2016

Related U.S. Application Data

(60) Provisional application No. 62/045,765, filed on Sep. 4, 2014.

(51) Int. Cl.
| | |
|---|---|
| *H04M 1/00* | (2006.01) |
| *H04M 1/18* | (2006.01) |
| *H04M 1/04* | (2006.01) |
| *H04M 1/21* | (2006.01) |

(52) U.S. Cl.
CPC .............. *H04M 1/185* (2013.01); *H04M 1/04* (2013.01); *H04M 1/21* (2013.01); *H04M 2250/14* (2013.01)

(58) Field of Classification Search
CPC .......... H04M 1/04; H04M 1/185; H04M 1/21; H04M 2250/14

USPC ............... 455/575.8, 569.1, 557, 550.1, 573; 361/679.56, 679.01; 206/521, 45.24, 37, 206/320, 45.2, 570; 29/428, 825; 312/280, 223.1; 220/694; 24/303, 442, 24/304; 345/156; 181/177

See application file for complete search history.

(56) References Cited

U.S. PATENT DOCUMENTS

| | | |
|---|---|---|
| 4,294,496 A | 10/1981 | Murez |
| 6,061,579 A | 5/2000 | Arai et al. |
| 6,324,380 B1 | 11/2001 | Kiuchi et al. |
| 6,646,864 B2 | 11/2003 | Richardson |

(Continued)

FOREIGN PATENT DOCUMENTS

| | | |
|---|---|---|
| CN | 202424817 U | 9/2012 |
| CN | 102920139 A | 2/2013 |

(Continued)

OTHER PUBLICATIONS

Extended European Search Report dated Apr. 15, 2016 issued in corresponding EP Application No. 13844712.3.

(Continued)

*Primary Examiner* — Tan H Trinh

(74) *Attorney, Agent, or Firm* — Morgan, Lewis & Bockius LLP

(57) ABSTRACT

A protective case is configured to receive a mobile device and to magnetically attach to another article and includes a front face mechanically connected to a plurality of side faces (the front face and side faces for detachably connecting to a mobile device), and a back face comprising at least one magnet for magnetically coupling an article comprising at least one magnet to said protective case.

20 Claims, 30 Drawing Sheets

(56) References Cited

U.S. PATENT DOCUMENTS

| | | | |
|---|---|---|---|
| 6,788,919 B2 | 9/2004 | Watanabe | |
| 7,299,077 B2 | 11/2007 | Pan | |
| 7,747,007 B2 | 6/2010 | Hyun et al. | |
| 7,933,122 B2 | 4/2011 | Richardson et al. | |
| 8,418,852 B2 | 4/2013 | Ziemba | |
| 8,517,172 B1* | 8/2013 | Chang | G06F 1/1626 206/320 |
| 8,676,281 B1* | 3/2014 | Caulder | H04M 1/0283 455/575.1 |
| 8,989,826 B1 | 3/2015 | Connolly | |
| 9,143,181 B1* | 9/2015 | Jia | H04B 1/3888 |
| 9,300,346 B2* | 3/2016 | Hirsch | H04B 1/385 |
| 9,319,087 B1* | 4/2016 | Cox, III | H04B 1/3888 |
| 2004/0204125 A1 | 10/2004 | Messel et al. | |
| 2005/0110752 A1 | 5/2005 | Pedersen et al. | |
| 2008/0023508 A1 | 1/2008 | Harchol | |
| 2009/0302799 A1 | 12/2009 | Marquet et al. | |
| 2010/0230301 A1 | 9/2010 | Fellig | |
| 2010/0302716 A1 | 12/2010 | Gandhi | |
| 2011/0034220 A1* | 2/2011 | Lee | G06F 1/1628 455/575.8 |
| 2011/0064401 A1* | 3/2011 | Desorbo | G03B 17/00 396/419 |
| 2011/0077061 A1 | 3/2011 | Danze et al. | |
| 2011/0079619 A1* | 4/2011 | Lewis | A45F 5/02 224/183 |
| 2011/0089078 A1* | 4/2011 | Ziemba | A45C 1/04 206/570 |
| 2011/0136427 A1 | 6/2011 | Al Qalqili et al. | |
| 2011/0136428 A1 | 6/2011 | Ritter | |
| 2011/0192857 A1* | 8/2011 | Rothbaum | B25F 1/00 220/694 |
| 2011/0294542 A1 | 12/2011 | Ray et al. | |
| 2012/0031786 A1* | 2/2012 | Mish | A45C 11/00 206/320 |
| 2012/0074006 A1* | 3/2012 | Monaco | H04M 1/15 206/320 |
| 2012/0194979 A1* | 8/2012 | Hsieh | G06F 1/166 361/679.01 |
| 2012/0252543 A1 | 10/2012 | Cho | |
| 2012/0261930 A1 | 10/2012 | Bethea | |
| 2012/0264491 A1 | 10/2012 | Singhal | |
| 2012/0303520 A1 | 11/2012 | Huang | |
| 2012/0309475 A1* | 12/2012 | Johnson | H04M 1/04 455/575.8 |
| 2012/0329532 A1* | 12/2012 | Ko | H04B 1/3888 455/573 |
| 2013/0050774 A1* | 2/2013 | Shimizu | H04N 1/00702 358/449 |
| 2013/0098788 A1* | 4/2013 | McCarville | A45C 11/00 206/320 |
| 2013/0105518 A1 | 5/2013 | McPherson et al. | |
| 2013/0148271 A1* | 6/2013 | Huang | H04B 1/3888 361/679.01 |
| 2013/0154914 A1* | 6/2013 | Salo | G06F 1/1628 345/156 |
| 2013/0180879 A1* | 7/2013 | O'Dowd | G06F 1/1628 206/521 |
| 2013/0181584 A1* | 7/2013 | Whitten | G06F 1/1656 312/223.1 |
| 2013/0182879 A1* | 7/2013 | Graber | H04R 1/345 381/343 |
| 2013/0237290 A1* | 9/2013 | Simmons, Jr. | H04B 1/3888 455/569.1 |
| 2013/0257240 A1* | 10/2013 | Hong | H04B 1/3888 312/223.1 |
| 2013/0265702 A1* | 10/2013 | Merenda | B65H 75/48 361/679.01 |
| 2013/0292288 A1* | 11/2013 | Willes | H04M 1/185 206/521 |
| 2013/0296004 A1* | 11/2013 | Tages | H05K 5/03 455/575.8 |
| 2013/0319882 A1* | 12/2013 | Berkovic | A45C 11/00 206/37 |
| 2014/0028162 A1* | 1/2014 | Carlson | H04M 1/0283 312/223.1 |
| 2014/0043735 A1 | 2/2014 | Han | |
| 2014/0066142 A1* | 3/2014 | Gipson | H04B 1/3888 455/575.8 |
| 2014/0078671 A1* | 3/2014 | Hong | H04B 1/3888 361/679.56 |
| 2014/0103789 A1* | 4/2014 | Cox, III | H05K 5/02 312/280 |
| 2014/0128132 A1* | 5/2014 | Cox, III | H04B 1/3888 455/575.8 |
| 2014/0152890 A1* | 6/2014 | Rayner | G06F 1/1626 348/376 |
| 2014/0174846 A1* | 6/2014 | Molinaro | G10K 11/08 181/177 |
| 2014/0187289 A1* | 7/2014 | Cataldo | H05K 13/00 455/557 |
| 2014/0228082 A1 | 8/2014 | Morrow et al. | |
| 2014/0235303 A1 | 8/2014 | Coughlan et al. | |
| 2014/0262848 A1* | 9/2014 | Fathollahi | A45C 11/00 206/37 |
| 2014/0262854 A1* | 9/2014 | Chen | A45C 11/00 206/45.24 |
| 2014/0272240 A1* | 9/2014 | Planche | B32B 7/06 428/42.1 |
| 2014/0287801 A1* | 9/2014 | Ho | H04B 1/3883 455/573 |
| 2014/0360893 A1* | 12/2014 | Whitten | A45C 11/00 206/45.2 |
| 2015/0011273 A1* | 1/2015 | Wilmhoff | H01Q 1/245 455/575.7 |
| 2015/0060505 A1* | 3/2015 | Brown | H04M 1/185 224/235 |
| 2015/0062787 A1* | 3/2015 | Wilson | H04M 1/185 361/679.01 |
| 2015/0065206 A1 | 3/2015 | Rojas | |
| 2015/0068935 A1* | 3/2015 | Kay | A45C 13/36 206/320 |
| 2015/0133204 A1* | 5/2015 | Ivanovski | H04B 1/3816 455/575.8 |
| 2015/0141090 A1* | 5/2015 | Hwan | H04B 1/3888 455/575.8 |
| 2015/0172431 A1* | 6/2015 | Huang | H04B 1/3888 455/556.1 |
| 2015/0194997 A1* | 7/2015 | Johnson | H04B 1/3888 455/575.8 |
| 2015/0194998 A1* | 7/2015 | Fathollahi | H04B 1/3888 455/575.8 |
| 2015/0198978 A1* | 7/2015 | Catchpole | G06F 1/1632 345/173 |
| 2015/0249478 A1* | 9/2015 | Greiner | H04B 1/3888 455/575.8 |
| 2015/0288405 A1* | 10/2015 | Gygax | H04M 1/04 455/575.1 |
| 2015/0303967 A1* | 10/2015 | Igarashi | H04M 1/04 455/575.8 |
| 2015/0312884 A1* | 10/2015 | Kharitonov | H04W 4/14 455/412.2 |
| 2015/0326702 A1* | 11/2015 | Ames | H04M 1/03 455/556.1 |
| 2015/0365756 A1* | 12/2015 | Merenda | H04R 1/1033 381/375 |
| 2015/0370288 A1* | 12/2015 | Dinesh | H04B 1/3888 455/566 |
| 2016/0013829 A1* | 1/2016 | Battle | H04B 1/3883 455/575.8 |
| 2016/0023617 A1* | 1/2016 | Chow | B60R 11/02 248/286.1 |
| 2016/0036480 A1* | 2/2016 | Hirsch | H04B 1/385 455/575.6 |

(56) References Cited

U.S. PATENT DOCUMENTS

| | | | | |
|---|---|---|---|---|
| 2016/0072933 | A1* | 3/2016 | Cox, III | H04M 1/185 455/575.8 |
| 2016/0192752 | A1* | 7/2016 | Lach | A45C 11/00 206/45.2 |
| 2017/0026498 | A1* | 1/2017 | Goldfain | A45C 11/182 |

FOREIGN PATENT DOCUMENTS

| | | |
|---|---|---|
| FR | 2968900 A1 | 6/2012 |
| KR | 20120003703 U | 5/2012 |
| KR | 10-1226084 B1 | 1/2013 |

OTHER PUBLICATIONS

International Search Report and Written Opinion dated Feb. 18, 2014, in corresponding International Application No. PCT/US2013/064584.

Magnet Mount for Smartphones http://www.imagnetmount.com/products/magnet-smartphone-mount/?id=1, Copy right (2012).

United States Office Action dated May 12, 2015, issued in corresponding U.S. Appl. No. 14/051,825.

United States Office Action dated Aug. 18, 2015, issued in corresponding U.S. Appl. No. 14/051,825.

United States Office Action dated Mar. 29, 2016, issued in corresponding U.S. Appl. No. 14/051,825.

United States Office Action dated Jul. 28, 2016, issued in corresponding U.S. Appl. No. 14/051,825.

United States Office Action dated Mar. 29, 2017, issued in corresponding U.S. Appl. No. 14/051,825.

Cox III, James L.; "Satellite Messenger Phone Case;" Design U.S. Appl. No. 29/427,570, filed Jul. 19, 2012.

Cox III, James L.; "GPS Communication Device;" Design U.S. Appl. No. 29/435,303, filed Oct. 23, 2012.

* cited by examiner

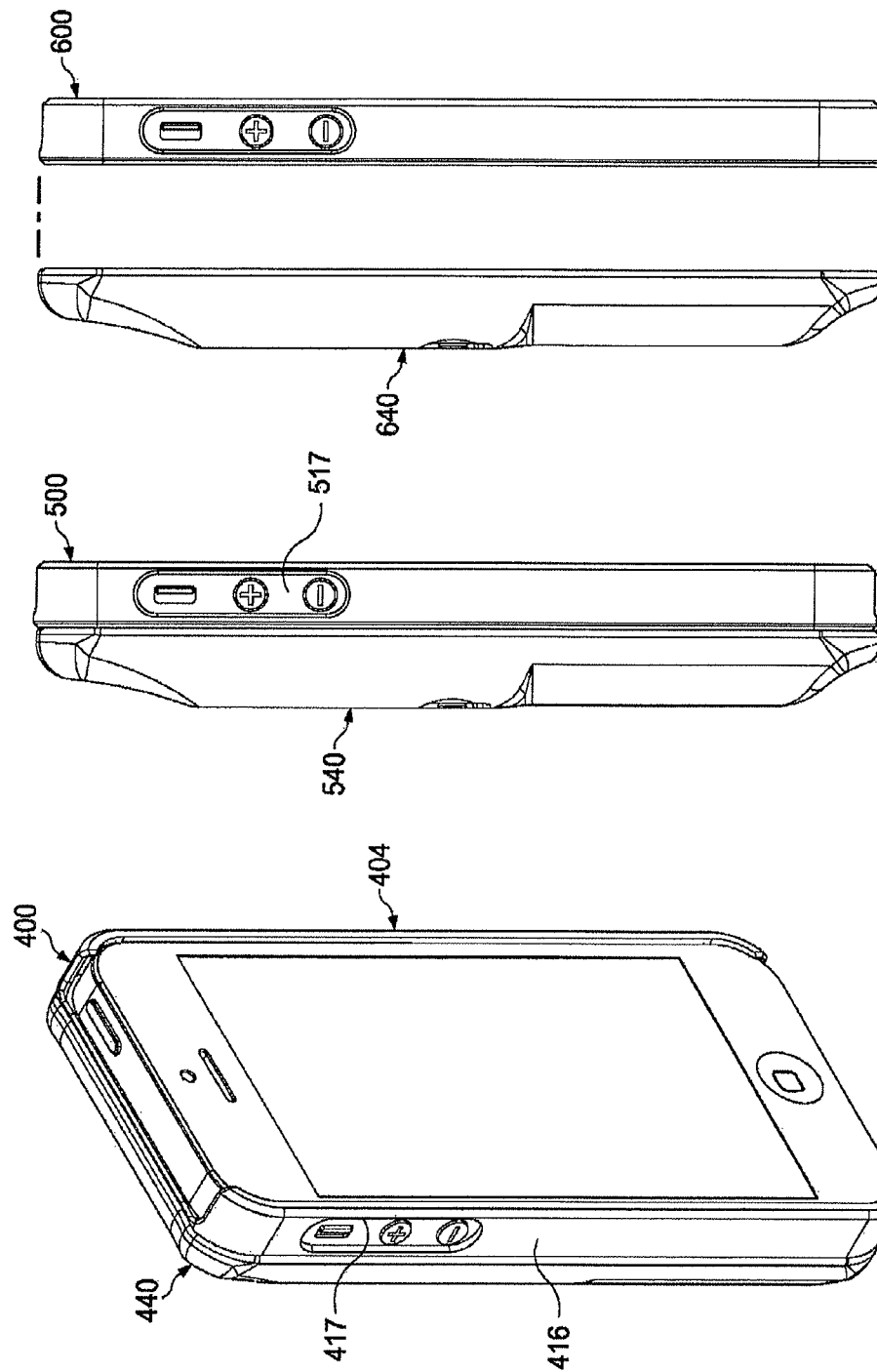

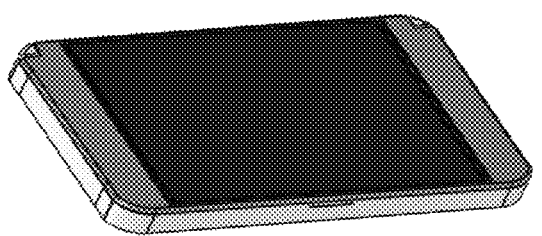
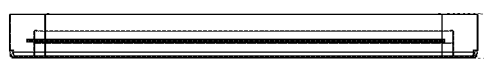
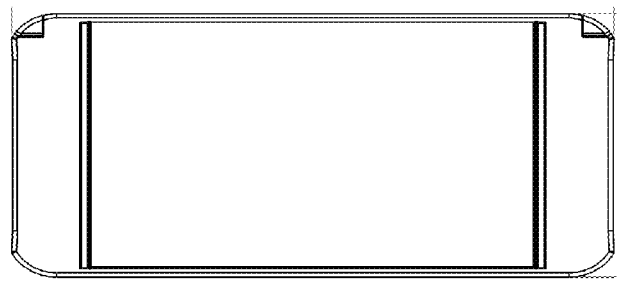
FIG. 17

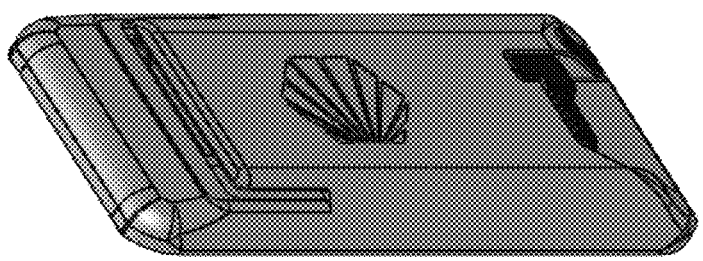
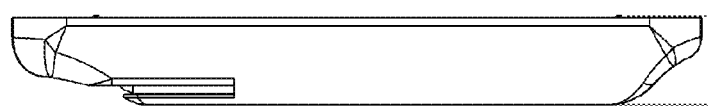
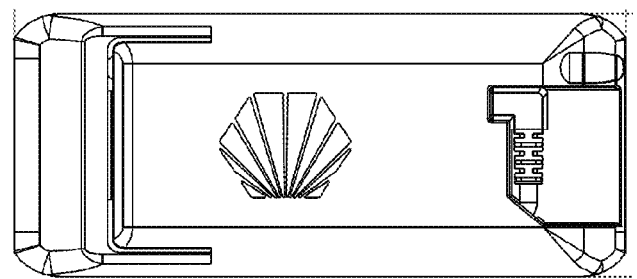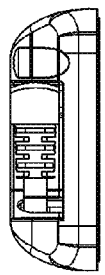
FIG. 18

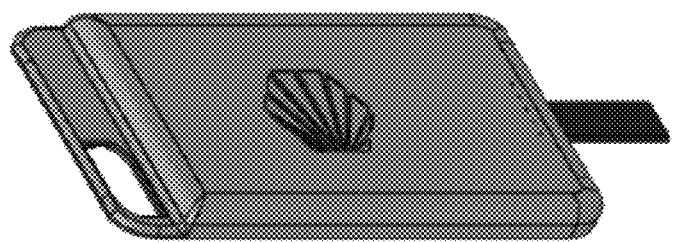
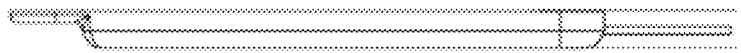
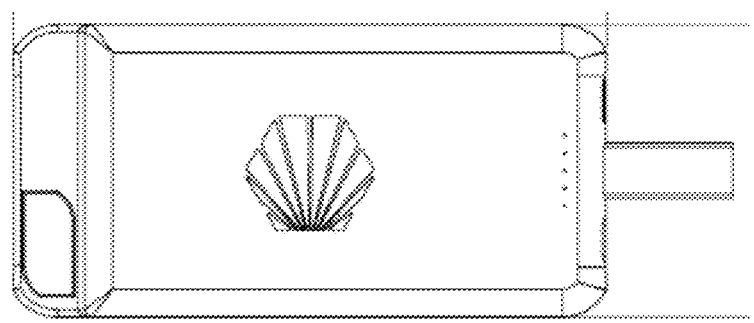
FIG. 19

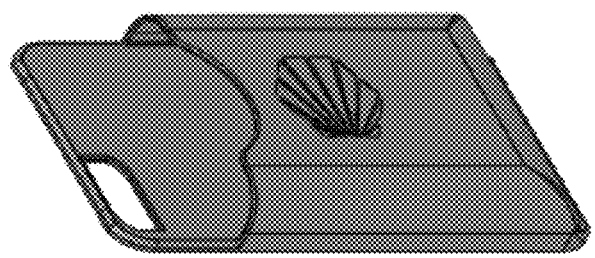
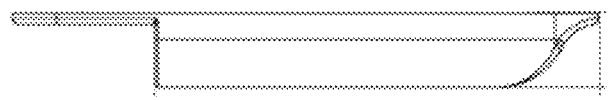
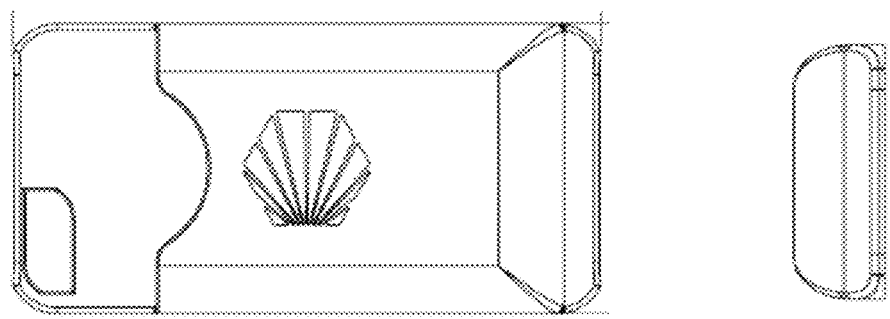
FIG. 20

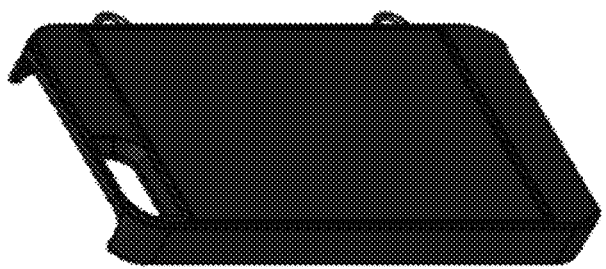
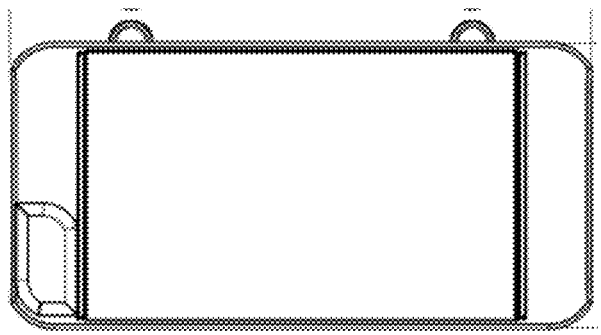
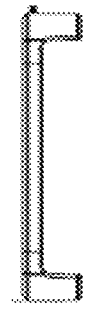
FIG. 23

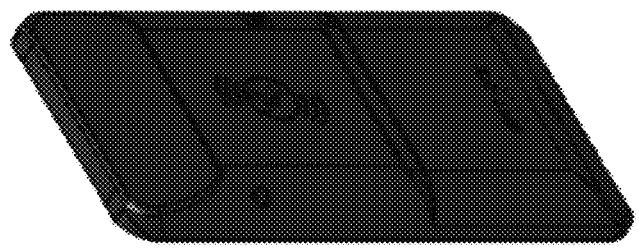
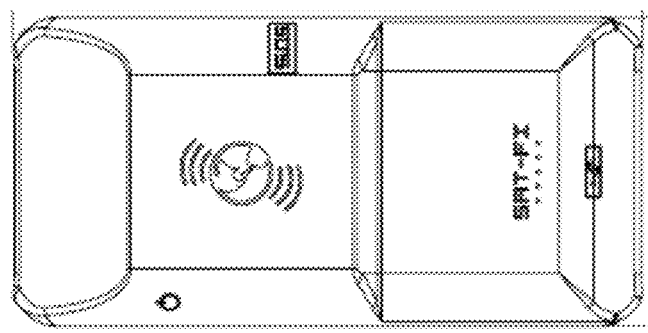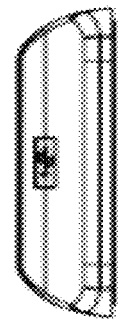
FIG. 24

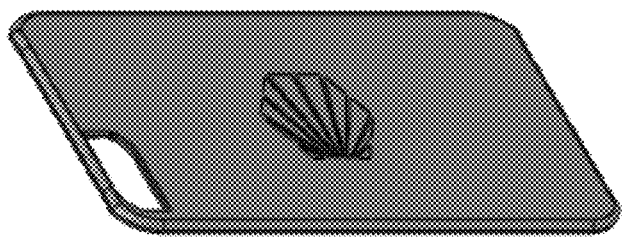
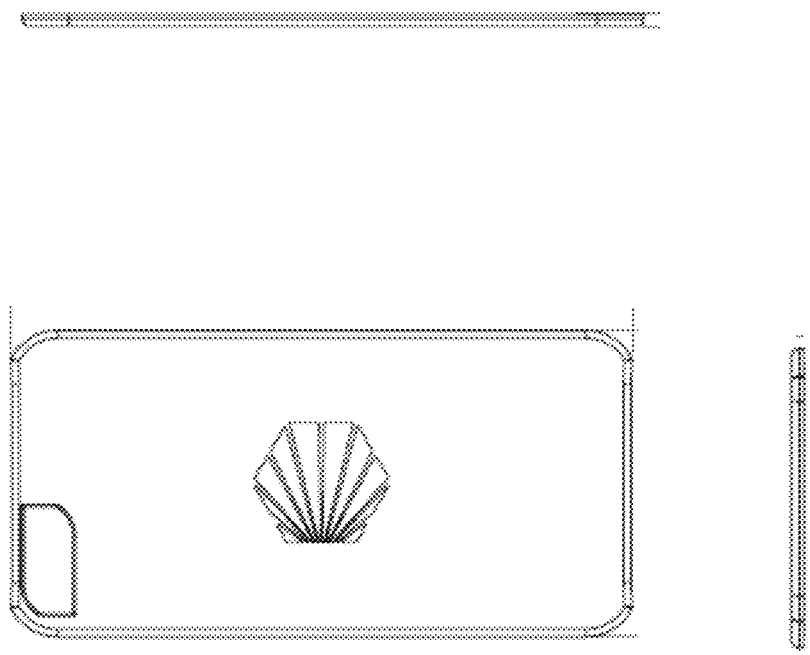
FIG. 26

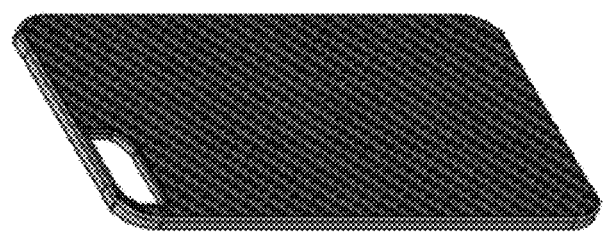
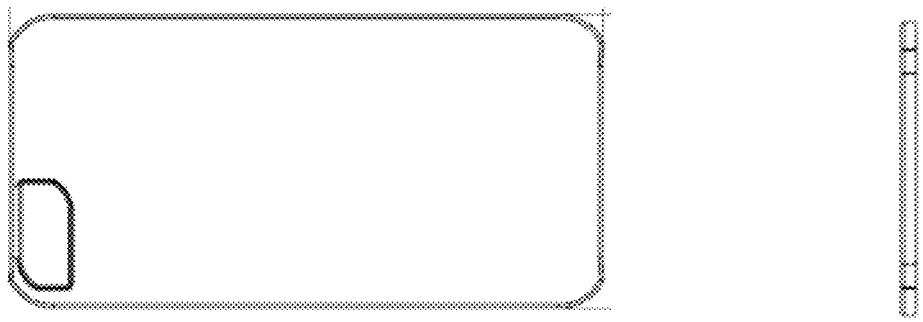
FIG. 27

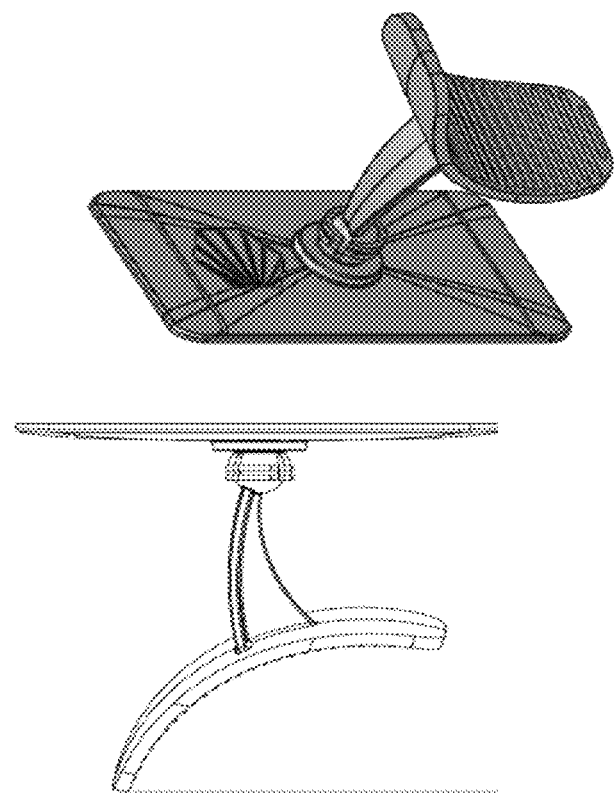
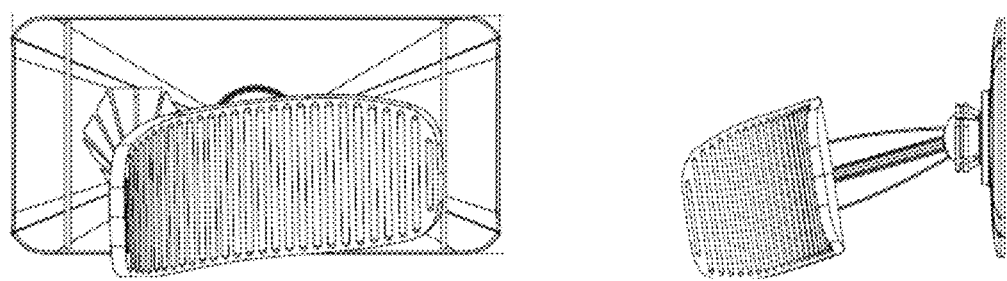
FIG. 28

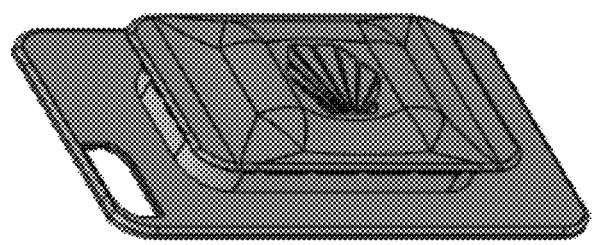
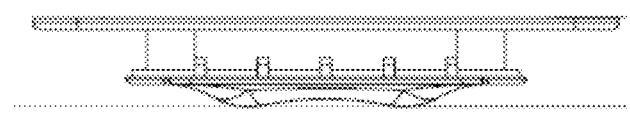
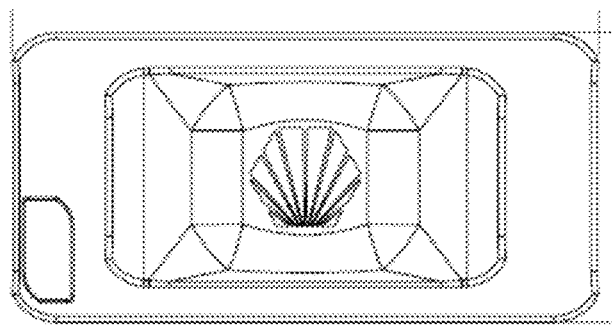
FIG. 29

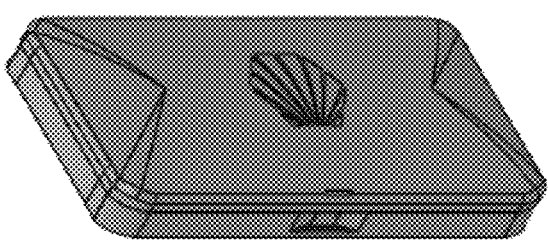
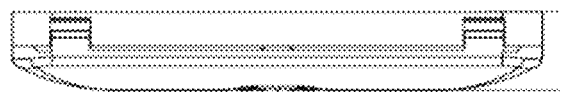
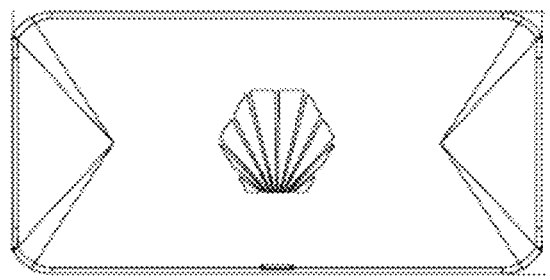
FIG. 31

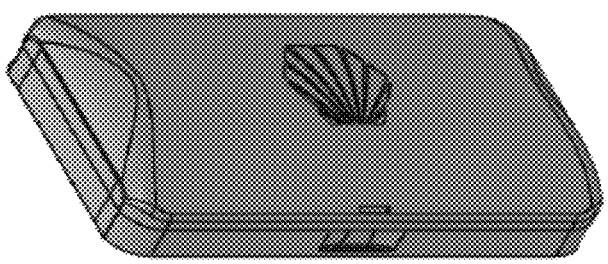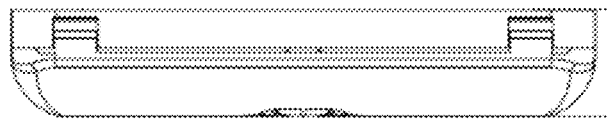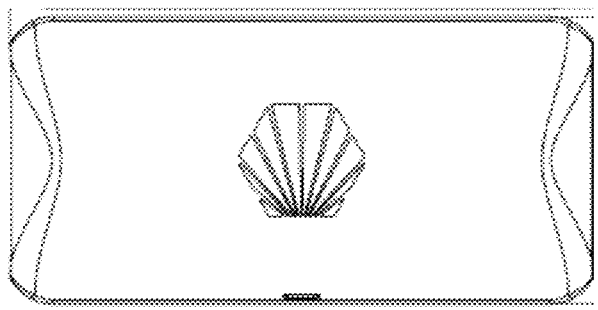
FIG. 32

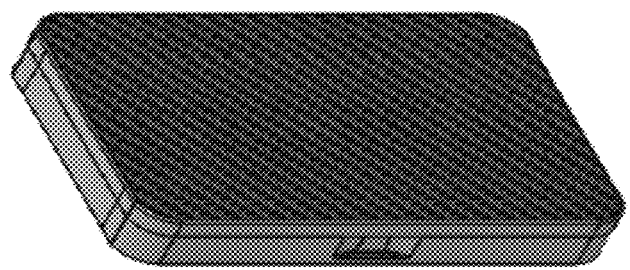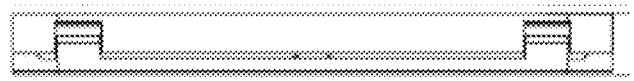
FIG. 35

CASE WITH INTERCHANGEABLE BACK PLATE

This application claims priority to copending U.S. Provisional Application No. 62/045,765, filed on Sep. 4, 2014, which is incorporated by reference.

TECHNICAL FIELD

Embodiments of the present invention relate generally to mobile-device carrying and/or protective cases and, in particular, to cases for cellular telephones, smartphones, satellite phones, tablets, laptop computers and other electronic devices.

BACKGROUND

Mobile devices, also known as personal or portable electronic devices (such as cellular phones, smart phones, tablets, laptop computers, e-book readers, MP3 players, pocket PCs, and similar products) are particularly susceptible to receiving damage from being dropped, at least because they are many times per day picked up, set down, used, or mishandled. Protective cases have long been used for such mobile devices; the evolution in their design has focused, however, on the protective aspects of such cases or, at most, cases for a single use or function (such as a case that includes a pocket to store a credit card). Aside from the limitation of a single use, existing cases limit the owner or user to a single look or design. If a different function or design is desired, a different case must be used. Switching between cases having different functions weakens the cases mechanically, eventually leading to their breaking. A need therefore exists for a more versatile, functional, and aesthetically configurable case.

BRIEF DESCRIPTION OF THE DRAWINGS

In the drawings, like reference characters generally refer to the same parts throughout the different views. In the following description, various embodiments of the present invention are described with reference to the following drawings, in which:

FIG. 4 is an orthogonal view of the front of an embodiment of the mobile device case with attached device in its environment;

FIG. 5 is a side view of the back plate and one side of an embodiment of the mobile device case with attached device in its environment showing through an aperture in the side of the case an exemplary mobile device;

FIG. 6 is a side view of a functional accessory detached from an embodiment of the mobile device case;

FIG. 17 is a plurality of views of a wallet case attachment;

FIG. 18 is a plurality of views of a credit-card reader;

FIG. 19 is a plurality of views of a battery pack attachment;

FIG. 20 is a plurality of views of a pouch attachment;

FIG. 23 is a plurality of views of a loops attachment;

FIGS. 24 and 25 are pluralities of views of satellite-antenna attachments;

FIGS. 26 and 27 are pluralities of views of a decorative plate having a camera aperture;

FIG. 28 is a plurality of views of a shoulder-prop attachment;

FIG. 29 is a plurality of views of an ear-bud winder attachment; and

FIGS. 30-35 are pluralities of views of a storage case attachment.

DETAILED DESCRIPTION

Described herein are various embodiments of methods and systems of a case sized and shaped to integrate a mobile device with another article or device interchangeably. The embodiments described or illustrated allow the combination of a mobile device and the interchangeable article to be carried simultaneously as one. In one exemplary embodiment, the interchangeable article is a protective back plate that has particular value to the user because of personal, affiliative, or aesthetic considerations. In another exemplary embodiment, the mobile device case forms a sleeve to hold a smartphone and an interchangeable device, for example a satellite communications device. In another exemplary embodiment, the case has a back that reversibly adheres, mates, couples, or attaches to another utilitarian article or device so that the two (or more) are easily carried together. The interchangeable devices can be easily removed from and reunited with the case for use without unsheathing the case from the mobile device.

As used herein, unless the context dictates otherwise, terms such as "coupled," "mated," "adhered," "attached" and so on mean and are intended to mean directly (in which two or more items are in contact with each other) and indirectly (in which at least one additional item is located between the at least two items). Therefore, terms such as "coupled to," "mated to," "attached to" and "adhered to" are used synonymously with "coupled with," "mated with," "attached with," and "adhered with". Preferably, such coupling, mating, adhering, and attaching are readily reversible and repeatable.

The discussion that follows describes many examples and embodiments of the inventive subject matter. Although each embodiment represents a single combination of inventive elements, the inventive subject matter includes all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed. Some aspects of carrying out the invention are described below as preferred embodiments with reference to the accompanied drawings, in which like features are indicated by like numerals.

Figure 1:
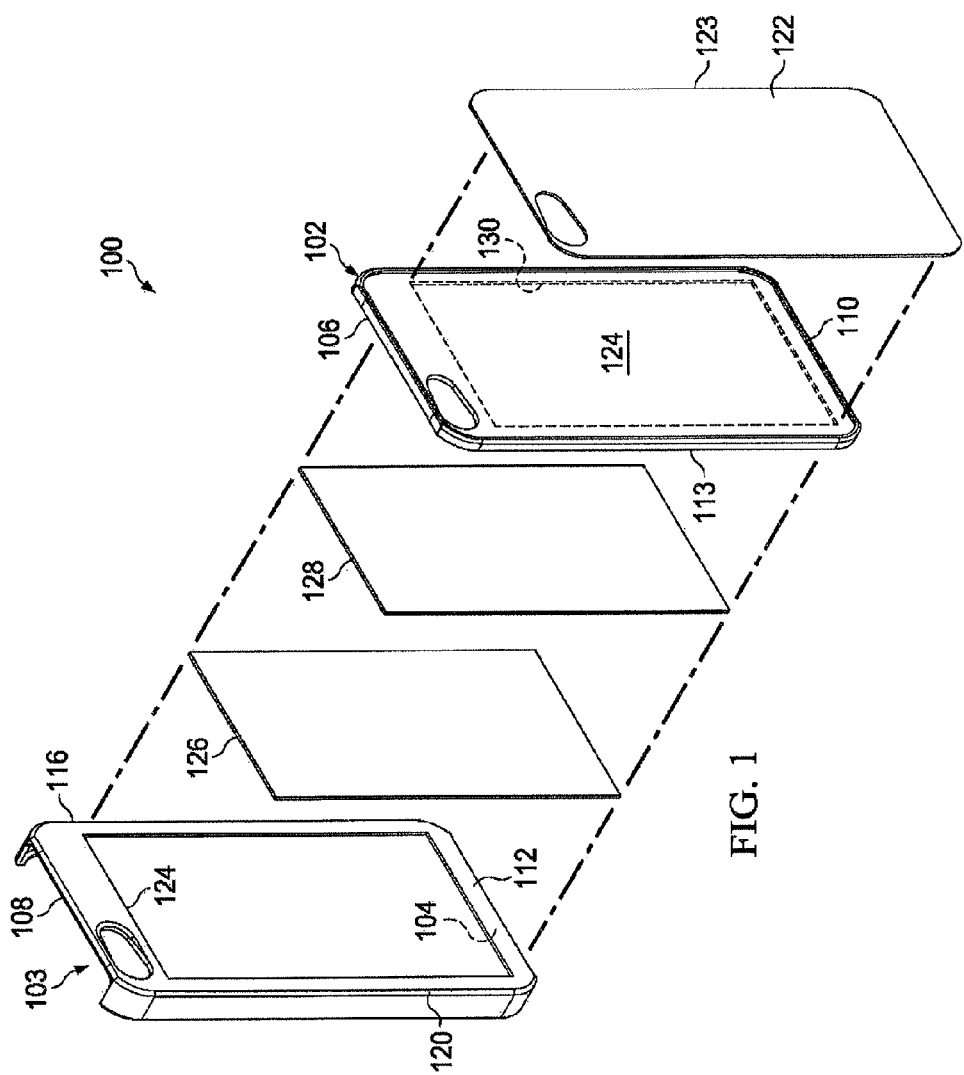
FIG. 1 is an exploded orthogonal view of an embodiment of the mobile device case showing a back plate in working relationship.

FIG. 1 is an exploded orthogonal view of an embodiment of the mobile device case 100 showing a detachable, interchangeable back plate 102 in its working relationship with the back face 104 of mobile device case 100. Back plate 102 is sized and shaped to conform to back face 104 of mobile device case 100. Thus, when back plate 102 is substantially flush against back face 104 of mobile device case 100, first minor edge 106 of back plate 102 is substantially parallel to first minor edge 108 of back face 104 of mobile device case 100. Likewise, when back plate 102 is substantially flush against back face 104 of mobile device case 100, second minor edge 110 of back plate 102 is substantially parallel to second minor edge 112 of the back face 104 of mobile device case 100. When back plate 102 is substantially flush against back face 104 of mobile device case 100, first major edge 113 of back plate 102 is substantially parallel to first major edge 120 of the back face 104 of mobile device case 100. Likewise, when back plate 102 is substantially flush against back face 104 of mobile device case 100, second major edge 114 (hidden) of back plate 102 is substantially parallel to second major edge 116 of the back face 104 of mobile device case 100. Continuing with FIG. 1, major exterior surface 122 of back plate 102 is shown substantially flat, meaning substantially two dimensional, without significant depression, relief, or variation in surface plane 123. Such an alternative embodiment is suited in particular for user involvement in choice of surface decoration, including the choice of surface material. Specifically, back plate 102 may be made having surface plane 123 having exterior surface 122 covered in any color or colors and in any material or materials, such as those that resemble copper, silver, gold, various common or exotic woods, carbon fiber, foam, rubber grip tape, mesh, textiles such as fabrics, wall papers, beads, tiles, leathers, hides, furs, and so on. Likewise, such an embodiment is amenable to the application of photographs, designs, and art provided by the user. Back plate 102 is designed to be relatively inexpensive to create using 3D printing, injection molding, or other fabrication techniques. As such, it is envisioned that organizations, fund-raising groups, teams, universities, artists and designers will produce a limitless variety of designs and patterns for surface plane 123 having exterior surface 122.

In another embodiment, surface plane 123 having exterior surface 122 may be raised or otherwise include contours. Such raising and/or contouring may enhance the ergonomics of the device or devices. Because mobile device case 100 is configured to reversibly and interchangeably mate with a variety of back plates 102, a variety of back plate configurations are provided for. As also shown in the exploded orthogonal view of FIG. 1, back plate 102 can be interchangeable. Back plate 102 is reversibly detachable to back face 104 of mobile device case 100 using a variety of techniques. Protective case 100 is shown with a recess or cutout 124 in back face 104. Recess 124 can receive an insert 126 that can include material that could be magnetic or drawn to magnetized material. Thus, insert 126 could be metallic or magnetized.

Correspondingly, insert 128 is configured to be placed in recess 130 (shown by dashed lines to represent the hidden face of back plate 102). Insert 126 and insert 128 can be retained in recess 124 and recess 130 using tension, friction, glue, mechanical fasteners, or otherwise. Likewise, insert 126 and insert 128 can be retained without the use of recesses. Insert 126 and insert 128 can include magnetic material, or one can include magnetic material and the other can include material attracted to a magnet.

In the exemplary embodiment of FIG. 1, mobile device case 100 can accommodate a communications device, such as a smartphone, and be sized to detachably connect to the device. As shown in FIG. 1, in one preferred embodiment, mobile device case 100 has six primary faces. As shown, in one preferred embodiment substantially the entire front face 103 (not shown) of mobile device case 100 is open to allow for a face of a device, for example a smartphone, to be accessible while the smartphone is placed with mobile device case 100. Alternatively, back face 104 and back plate 102 can be configured to reversibly mate, couple, or adhere to each other by mechanical or other means. One or the other or both back face 104 or back plate 102 can be shaped to snap, or reversibly clip to, releasably latch to, connect, fasten, or reversibly lock to the other. Either of back face 104 or back plate 102, or both may include a material such as one of the components of VELCRO, fibrillar adhesive, microfiber cloth, or adhesive materials, for example.

Figure 2B:
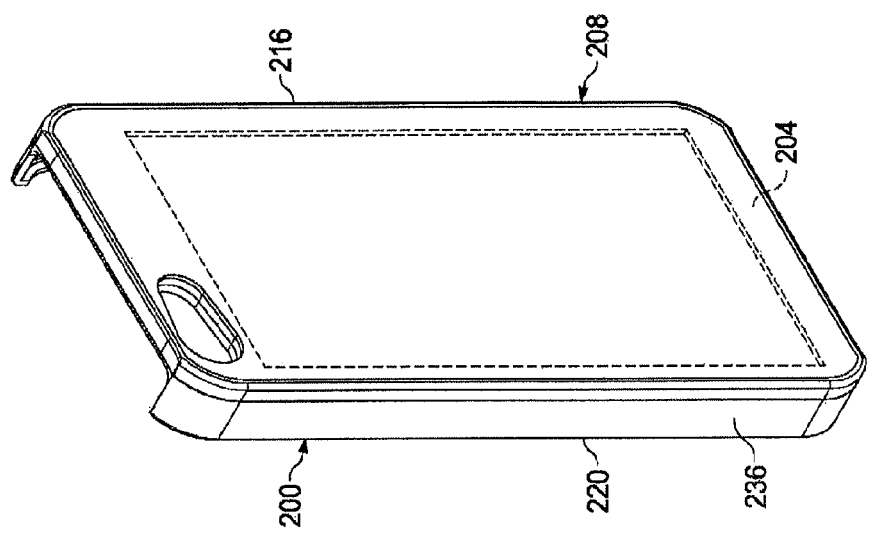
FIG. 2b is a back view of an embodiment of the mobile device case (reversibly detachable back plate not shown)
Figure 2A:
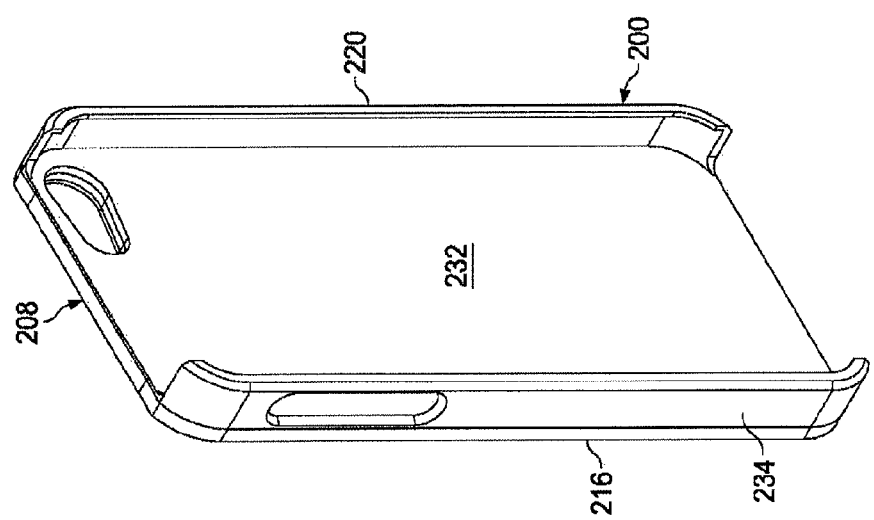
FIG. 2a is a front view of an embodiment of the mobile device case (reversibly detachable back plate not shown)
Figure 2D:
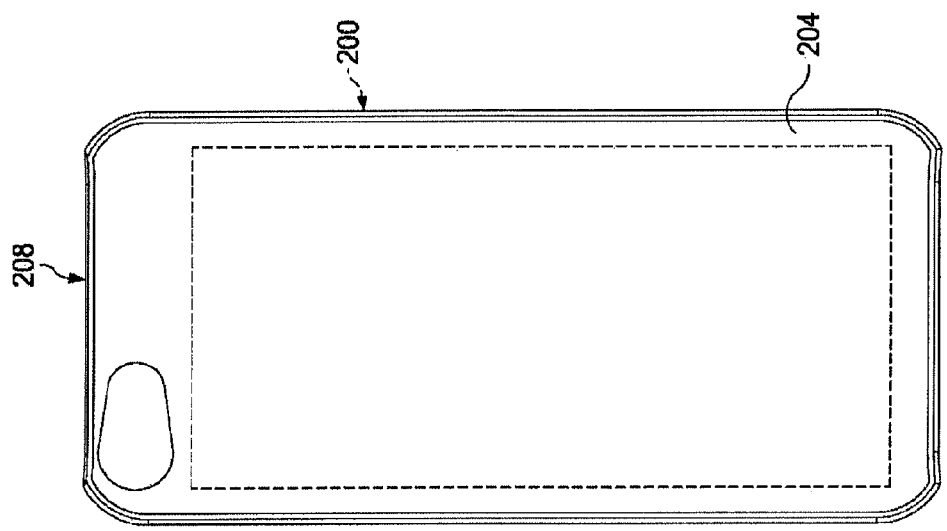
FIG. 2d is a front view of an embodiment of a back plate for a mobile device case.
Figure 2C:
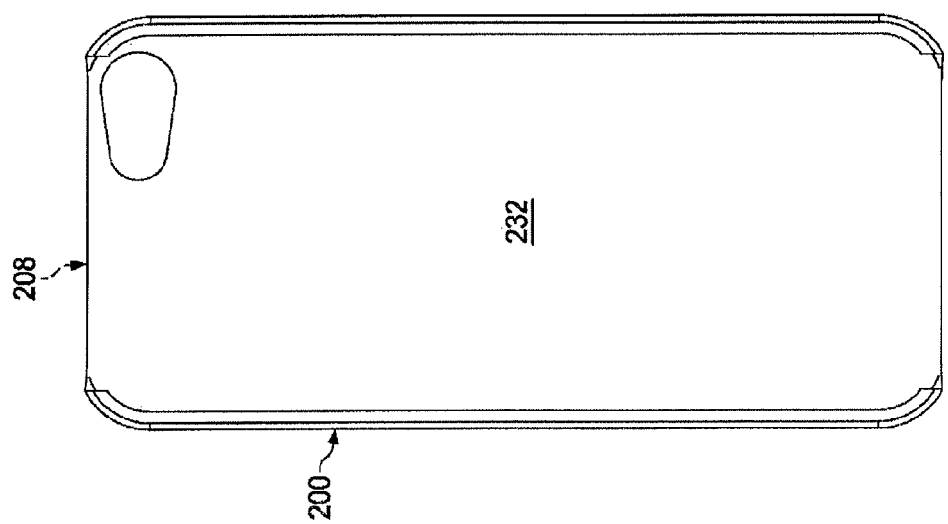
FIG. 2c is a back view of an embodiment of a back plate for a mobile device case.
Figure 2F:
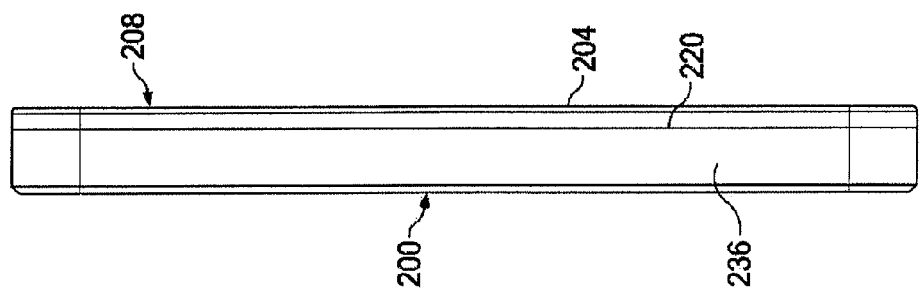
FIG. 2f is a side view of an embodiment of a mobile device case shown having reversibly attachable back plate in place.
Figure 2E:
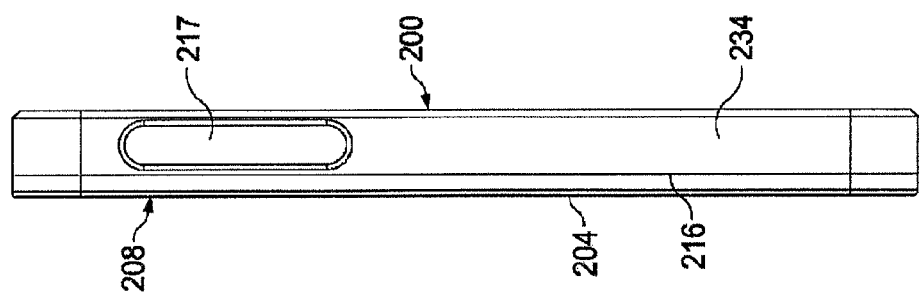
FIG. 2e is a side view of an embodiment of a mobile device case showing where one side forms an aperture to accommodate a mobile device (not shown) and having reversibly attachable back plate in place.

Turning now to FIGS. 2a-f, FIG. 2a is a front view of an embodiment of the mobile device case 200 having interior surface 232 of back face 204 exposed and opposed exterior surface 222 (hidden). There may be one or more planes and surfaces intercalated between interior surface 232 of back face 204 and exterior surface 222. In FIG. 2a, exterior surface 234 of major side 216 of mobile device case 200 faces the observer. The exterior surface 236 (hidden) of opposed major side 220 faces away from the viewer observer in FIG. 2a. FIG. 2b is a back view of an embodiment of mobile device case 200 with a back plate. In FIG. 2b, exterior surface 236 of major side 220 is exposed to the observer, as is back face 204 of back plate 208. FIG. 2c shows the interior surface 232 of mobile device case 200. Interior surface 232 may be adorned even though it typically is not be visible when mobile device case 200 is coupled with a mobile device, such as a smartphone. FIG. 2d shows a back view of an embodiment of back plate 208 for a mobile device case 200. Such embodiments may allow user involvement in the choice of surface decoration for exterior surface face 204; the user may, for example, select from one of a plurality of available decorations and/or create a custom decoration (based on, for example, a user-submitted photo or picture). FIG. 2e is a side view of a mobile device case 200 showing where side surface 234 and side 216 form aperture 217 to accommodate a mobile device (not shown) and having an embodiment of back plate 208 in place. FIG. 2f is a side view of an embodiment of a mobile device case 200 also showing an embodiment of back plate 208 in place substantially flush with back face of mobile device case 200.

Figure 7:
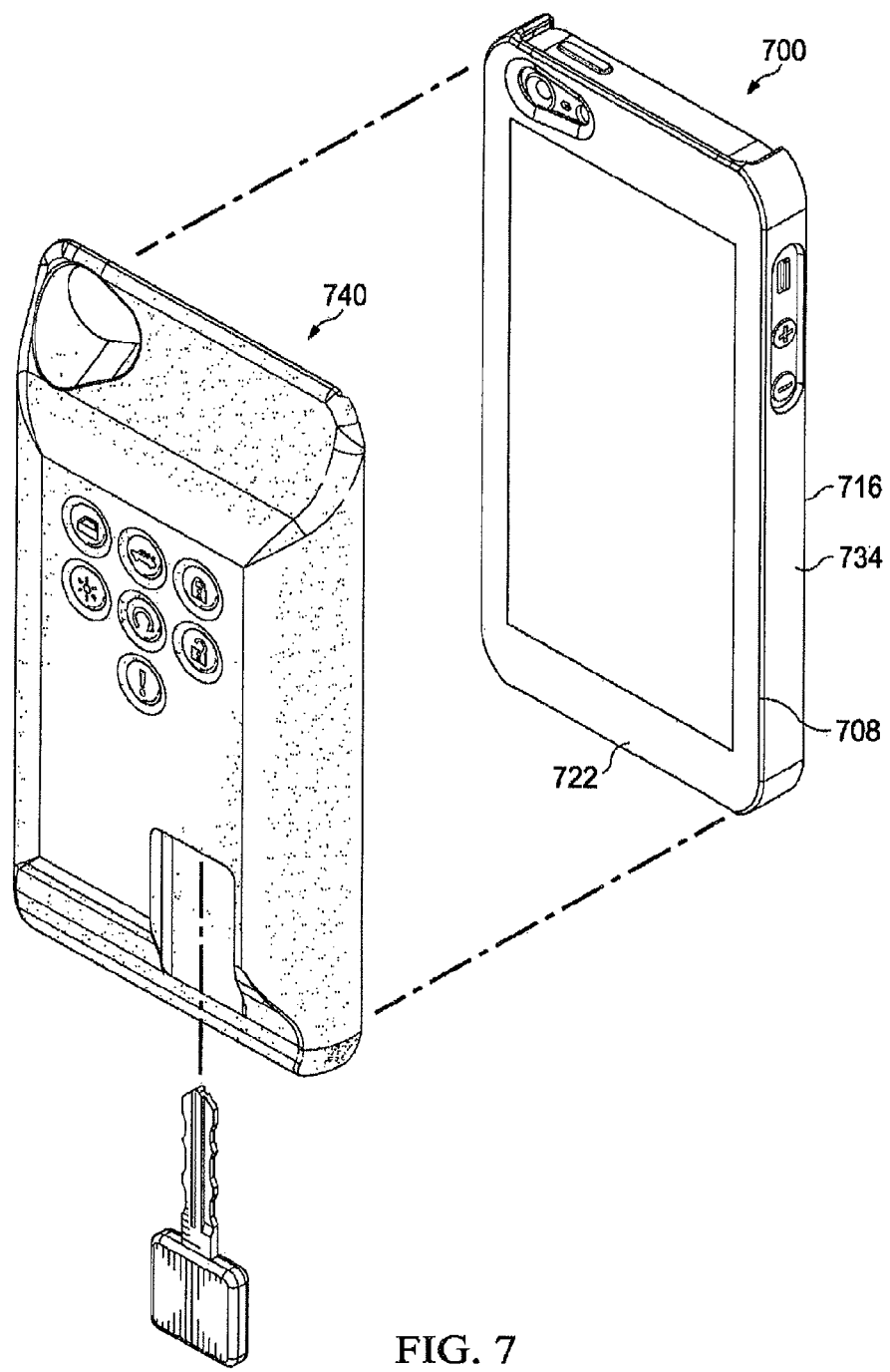
FIG. 7 is an exploded orthogonal view of a functional accessory detached from an embodiment of the mobile device.

In accordance with an exemplary embodiment, back plate 208 can also be the side of an article or device, or can be configured to reversibly mate to, couple to, adhere to, or attach to an article or device including, for example, a mobile hot spot; a GOPRO video recorder; a paper notepad; a mini epinephrine pen; an inhaler; a vaporizer; a combination lock; a foldable eyeglasses case; a computer mouse; a finger pad; a BLUETOOTH headset holder; an APPLE IPOD; an MP3 player; a digital voice recorder; a shoulder rest; a GPS device; a satellite communication device; a compass; a whistle; a first aid kit; a data expansion pack; a video game controller; a laser pointer; access key card; cellular signal booster; full range AM/FM transmitter; a pedometer, an accelerometer; a speaker; a flash light; a digital scale; a thermostat; a key slot; a key ring; a toll tag; a pill compartment; a pen; a birth control compartment; an FM transmitter; a magnifying glass or plastic card; a GIGAPET, a card deck holder; a fan that circulates bug repellant or aromas; a baby monitor; a flash drive; a credit card reader; stylus; a fish eye lens; a heart rate monitor; a glucose meter with lancet and extra test strips; a blood pressure reader; a floating device designed to keep mobile device 200 afloat; a WI-FI modem; a projector screen; a bottle opener; a battery pack; pepper spray; a makeup compartment; an ETCH-A-SKETCH; a roller maze; a watch face; a compartment for, for example, a condom, coins, tickets, a tampon, earbuds, lip balm, lotion, sunscreen, utility tool, level, band aids, perfume or cologne, sanitizer, contact lenses, cigarettes, lighter, electric cigarettes, flask, breathalyzer, credit cards, business cards, gum, mints, or cough drops, measuring tape, mirror, money clip or a smart key (as shown in FIG. 7). It is to be understood that this is not meant to in any way limit the application of these inventions to those disclosed devices. For example, related or unrelated devices may also be applicable. All of the aforementioned items, as well as the following items could be attached to the mobile device as shown, for example, in FIG. 7.

The size, including width and height, as well as the configuration of reversibly attachable article or device (not shown) may vary depending on the shape and size of mobile device case 200. Back plate 208 may accommodate different mobile devices of different sizes, including for example, smartphones, APPLE IPADS or IPADS, laptop computers, and tablets.

Figure 3:
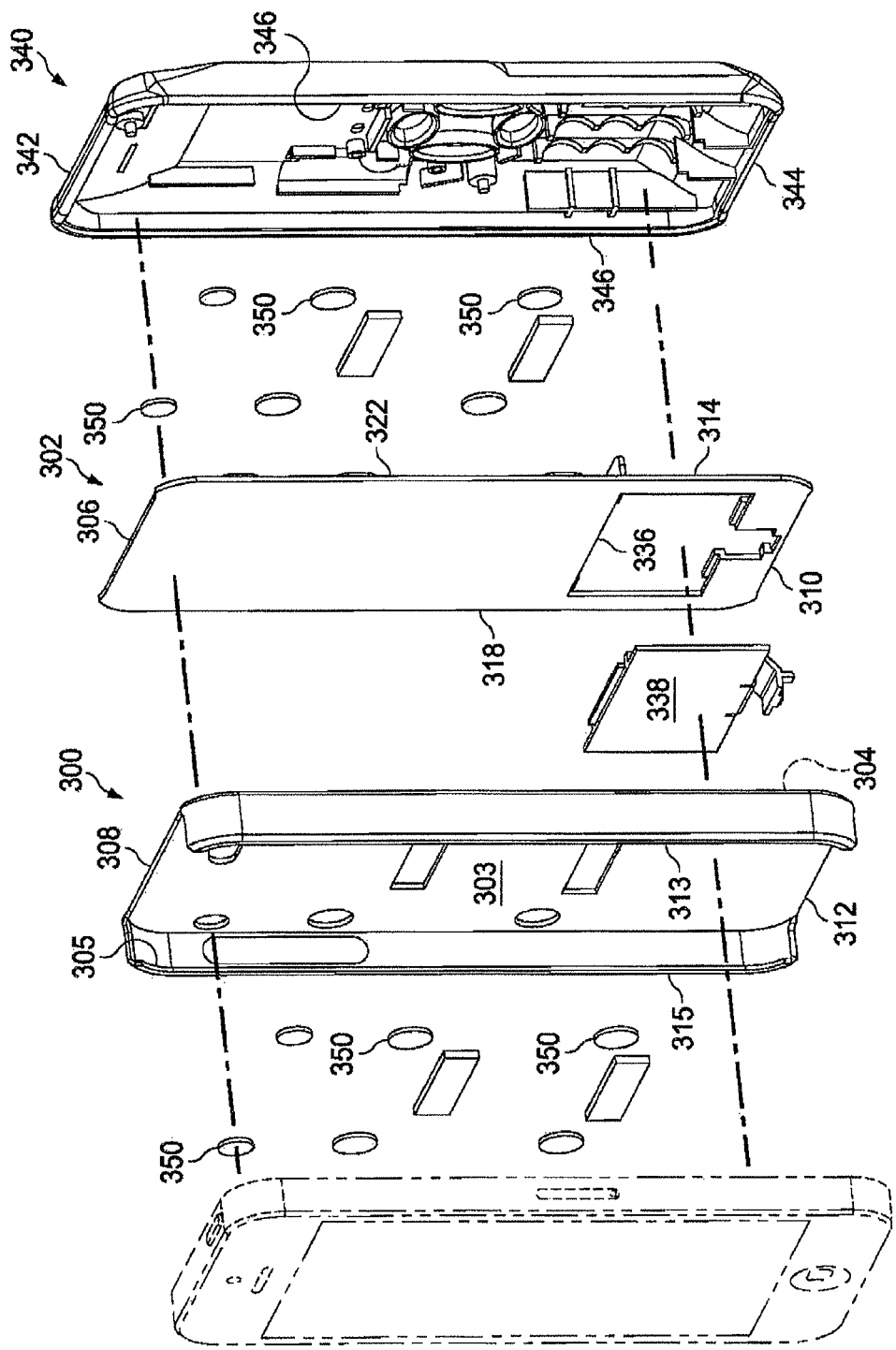
FIG. 3 is an exploded orthogonal view of an embodiment of the mobile device case including the back plate and the attachable device in working relationship including in phantom a representative mobile device.

FIG. 3 is an exploded orthogonal environmental view of one embodiment of mobile device case 300. FIG. 3 shows one embodiment of detachable, interchangeable back plate 302 in its working relationship with back face 304 (hidden from the observer and not shown) of mobile device case 300. Back plate 302 is sized and shaped to conform to back face 304 of mobile device case 300. In the embodiment shown, detachable, interchangeable back plate 302 forms an aperture 336 sized and located to accommodate battery access for the device or article to be reversible attached to, mated to, coupled to, or adhered to mobile device 300 using back plate 302. Detachable, interchangeable back plate 302 in this embodiment forms aperture 336 sized and located to accommodate battery access cover 338 for use in reversibly attachable article or device 340, which as illustrated could be a satellite communication or GPS device. As described elsewhere in this specification, however, the back plate 302 may be associated with any detachable article, device, or plate, such as a credit-card reader, key/credit-card storage wallet, or decorative plate.

As shown in the preferred embodiment of FIG. 3, back plate 302 may be configured to be positioned substantially flush against back face 304 of mobile device case 300. When back plate 302 is substantially flush against back face 304 of mobile device case 300, first minor edge 306 of back plate 302 is substantially parallel to first minor edge 308 of mobile device case 300. Likewise; when back plate 302 is substantially flush against back face 304 of mobile device 300, first minor edge 306 of back plate 302 is substantially parallel to first minor edge 342 of reversibly attachable article or device 340, which in FIG. 3 is a satellite communication or GPS device. When back plate 302 is substantially flush against back face 304 of mobile device case 300, second minor edge 310 of back plate 302 is substantially parallel to second minor edge 312 of the back face 304 of mobile device 300. Likewise, when back plate 302 is substantially flush against back side 304 of mobile device 300, second minor edge 310 of back plate 302 is substantially parallel to second minor edge 344 of reversibly attachable article or device 340.

When back plate 302 is substantially flush against back face 304 of mobile device case 300, first major edge 314 of back plate 302 is substantially parallel to first major edge 313 of the back face 304 of mobile device 300. Likewise back plate 302 is substantially flush against back face 304 of mobile device case 300, second major edge 318 of back plate 302 is substantially parallel to second major edge 315 of back face 304 of mobile device case 300. When back plate 302 is substantially flush against back face 304 of mobile device case 300, first major edge 314 of back plate 302 is substantially parallel to first major edge 346 of the reversibly attachable article or device 340.

As shown, mobile device case 300 can be secured to a mobile device for example by lip 305. Lip 305 may extend slightly from two or more faces such as the front face 303 or side faces 313 and 315 of mobile device case 300. Thus, side faces 313 and 315 may be used in this embodiment to hold reversibly attachable article or device 340 in place using lip 305. The intersections of each of such face help secure a smartphone or other device by mobile device case 300. Any slight flexibility of the material from which the mobile device case 300 is made allows for a smartphone or other mobile device to be snapped in and out of mobile device case 300 with minimal force, but exerts sufficient restraining force to prevent the smartphone from falling from protective case 300 under its own weight or the magnitude of forces typically associated with normal operation of a mobile device.

Continuing with FIG. 3, major interior surface 322 (facing away from the observer in FIG. 3) of back plate 302 is shown as reversibly detachable to back face 304 of mobile device case 300 using a set of magnets 350. In other words, the magnetic attraction of magnets 350 disposed in or otherwise mechanically attached to the electronic device 340 to magnets 350 disposed in or otherwise mechanically attached to the case 300 secures the device 340 to the case 300. In this embodiment, when the device or article 340 is secured to the case 300, the face of the reversibly attached article or device 340 becomes the major exterior surface (i.e., the interior face 304 of the case 300 is wholly or partially obscured by the article or device 340). Although magnets 350 in one embodiment may comprise six disc and two bar magnets, the number, size, shape, strength and placement of magnets 350 may vary (i.e., be a design or manufacturing choice). In other instances the number, size, shape, strength and placement of magnets 350 may be influenced by the identity and requirements of either the mobile device or the reversibly detachable article or device 340. In other embodiments, as shown in FIG. 1, the magnets may be sheet magnets 126, 128. Likewise, this disclosure includes magnets 350 as a component of back plate 302 with or without recesses therein to accommodate them.

The magnets 126, 128, 350 may vary in size, position, and strength. In one embodiment, the magnets 126, 128, 350 produce enough attractive force between the article 340 and case 300 such that the two components do not unintentionally or undesirably separate after attachment therebetween due to, for example, the dropping of the components, jostling of the components in a pocket, backpack, or other container, or even through normal use of the components. In this embodiment, however, the magnets 126, 128, 350 do not produce so much attractive force that intentional separation of the components becomes difficult or impossible. In various embodiments, the attractive force produced between the magnets 126, 128, 350 varies in accordance with a user preference—a young or old user having weak hand strength may prefer a weaker attractive force, for example, while other users may prefer a stronger attractive force for its increased robustness in maintaining the connection between the article or device 340 and the case 300. In some embodiments, the magnets 350 in the article 340 vary in strength in accordance with the size or weight of the article 340—heavier/larger articles 340, such as a satellite communication device or credit-card reader, may have larger/stronger/more magnets 350, while slimmer/lighter articles 340, such as a decorative plate, may have smaller/weaker/fewer magnets 350. In other embodiments, the magnets 350 may be sized or positioned in the article 340 to account for and defend against the placement and direction of anticipated forces applied to the article 340—for example, in the case of a credit-card reader, magnets 350 may be positioned to keep the article 350 secure despite a side-to-side (or other) swiping motion inherent in swiping credit cards and any associated force transmitted to the article 340.

In one embodiment, mechanical means prevents the article 340 from sliding or otherwise moving laterally with respect to the case 300 when the two components are connected together (via magnets 350 or other means). These mechanical means may be, for example, studs on one component mated to divots or recesses on the other; a lip or other protrusion on one component that mates with an outside edge or edges of the other; a rail or other raised protrusion on one component that mates with a groove or trench on the other; or any other such mechanical means. These rails, lips, or studs prevent or reduce sliding between the components, thereby increasing the effectiveness of the magnetic bond therebetween at least because, typically, breaking or otherwise overcoming a magnetic bond requires less force or other energy input if the magnets (or components attached to said magnets) are slid past each other, as opposed to being pulled directly apart from each other.

In one embodiment, the case 300 allows access to a USB, docking, or other port disposed on the smartphone or other device. Many docking stations exist for docking (i.e., mechanically connecting) a smartphone or other such device to a larger electronic component that provides additional features; for example, an audio output device (e.g., receiver and speakers) may include a docking port for receiving a smartphone, thereby allowing music stored on the smartphone (e.g., MP3 files) to be played on the speakers through the receiver. Many existing protective cases are too thick for, or otherwise prevent, docking of said phone while it is connected to said case. The case 300 of the present invention allows docking of a smartphone held within a docking station; in one embodiment, the article or device 340 is first detached from the case 300 before docking.

In one preferred embodiment, back plate 302 can be configured to reversibly mate to, couple to, or adhere to or with device or article 340 by physical or mechanical means, rather than by magnetic or electromechanical means. Back plate 302 can be shaped to snap, or reversibly clip to, releasably latch to, connect, fasten, or reversibly lock to article or device 340. Back plate 302, or article 340 may include a material such as one of the adherent components of VELCRO, fibrillar adhesive, microfiber cloth, or adhesive materials, for example. The magnets 350, or other means of securing the back plate 302, may be on the front or back side of the back plate 302.

Such an embodiment is illustrated in FIG. 4, which is an orthogonal view looking toward the front of an embodiment of mobile device case 400 with reversibly attachable device 440 attached, in its working environment showing through front face 404 and side face 416 of case 400 an exemplary mobile device. In the embodiment of FIG. 4, side 416 of mobile device case 400 forms an aperture 417 for access to, in this example, three components of the mobile device, Such components might include headphone or earbud jacks, controls, or the like. In this embodiment, the four edges of reversibly attachable article or device 440 are substantially flush with the four edges of mobile device case 400. Thus, the exterior configuration of reversibly attachable article or device 440 can preferably be configured to accommodate the purpose and functions of reversibly attachable article or device 440 as well as to accommodate the use of mobile device case 400. In one preferred embodiment, mobile device case 400 may have strategically placed grips for positioning a user's hand at a location that does not interfere with the operation of reversible attachable device 440 and thus prevents a user's hand from slipping relative to the mobile device case 400. Reversibly attachable article or device 440 is easily and comfortably ported and its use is facilitated without any need to unease or unsheathe reversibly attachable article or device 440 from mobile device case 400.

FIG. 5 is a side view showing the back and one side of an embodiment of the mobile device case 500 with a reversibly attachable device 540 attached, in their environment showing through an aperture 517 in the side of the mobile device case 500 an exemplary mobile device. In this embodiment, reversibly attachable article or device 540 is shown having a length essentially equal to the mobile device case 500. All four edges (not shown) of reversibly attachable article or device 540 may extend beyond any or all four edges of mobile device case 500. Likewise, all four edges (not shown) of reversibly attachable article or device 540 may not extend to any or all four edges of mobile device case 500. Exterior configuration of reversibly attachable article or device 540 is configured to accommodate the purposes and functions of reversibly attachable article or device 540 as well as to accommodate the use of mobile device case 500.

FIG. 6 is a side view of an embodiment that shows a reversibly attachable article or device 640 attached to a back plate (not shown) of the mobile device case 600 for reversible attachment and detachment to mobile device case 600. Back face 604 (not shown) and back plate 602 (not shown) are preferably configured to reversibly mate, couple, or adhere to each other by mechanical or other means. In the embodiment shown, magnetic coupling would work. Alternatively, one or the other or both back face 604 (not shown) or back plate 602 (not shown) can be shaped to snap, or reversibly clip to, releasably latch to, connect, fasten, or reversibly lock to the other. Either of back face 604 (not shown) or back plate 602 (not shown), or both may include a material such as one of the components of VELCRO, fibrillar adhesive, microfiber cloth, or adhesive materials, for example. The choice of mating material is made to foster maintenance of the engagement strength between mobile device case 600 and reversibly attachable article or device 640 through repeated use and multiple attachments, detachments, and reattachments.

The reversibly attached devices 540, 640 of FIGS. 5 and 6 (and/or any of the attached devices described throughout this application) may be designed/re-designed, or otherwise configured to minimize their thickness with respect to the device case 500, 600 and the electronic device connected thereto. Certain electronic devices, such as satellite communicators or credit-card readers, may originally be designed to fit within an enclosure of smallest volume by, for example, stacking batteries on top of a printed-circuit board. These sorts of designs may lead to an overall enclosure having a height and width smaller than that of the device case 500 but having an undesirably large thickness. In various embodiments, the attached devices 540, 640 are designed to have a height and width equal to or approximately equal to that of the device case 500, 600 and to thereby take advantage of that height and width to reduce thickness. For example, in one embodiment, power is provided to the devices 540, 640 via a battery connected to a printed circuit board via a wire instead of direct, spring-contact connection thereto, thereby allowing placement of the battery (or batteries) on the same horizontal plane (with respect to the main faces of the case 500, 600) as the printed circuit board. Other components of the devices 540, 640 (e.g., jacks, ports, screens, buttons, etc., and the circuitry required to drive/power/control the same) may be similar disposed on this same horizontal plane to further minimize the thickness of the attached devices 540, 640. In another embodiment, batteries having a minimal thickness (such as, for example, AAA or AAAA batteries) are used to minimize the thickness of the devices 540, 640.

Turning now to FIG. 7, FIG. 7 is an orthogonal view of an embodiment of mobile device case 700 showing back face 708 and exterior surface 722 in planar arrangement with reversibly attachable device 740. As shown, reversibly attachable device 740 is a smart key. Exterior surface 734 of major side 716 of mobile device case 700 faces the observer. The exterior surface 736 (hidden) of opposed major side 720 (hidden) faces away from the observer. In accordance with this exemplary embodiment, back plate 708 is configured to reversibly mate to, couple to, adhere to, or attach to an article or device including, as shown for example, a smart key.

Figure 12:
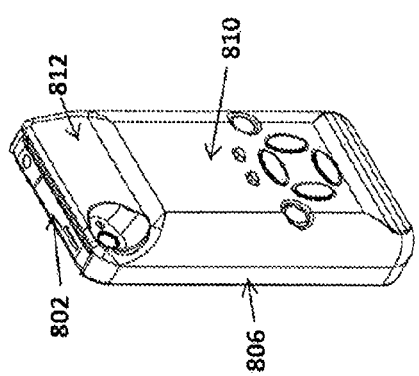
FIG. 12 is an orthogonal view of the back and side of an embodiment of the protective case.
Figure 8:
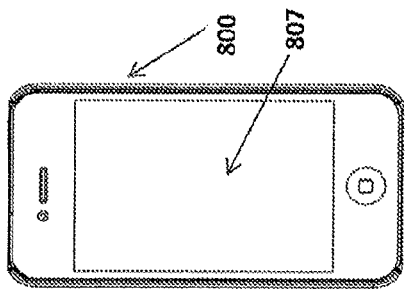
FIG. 8 is an orthogonal view of an embodiment of the protective case in its environment showing through the front face an exemplary smartphone.
Figure 11:
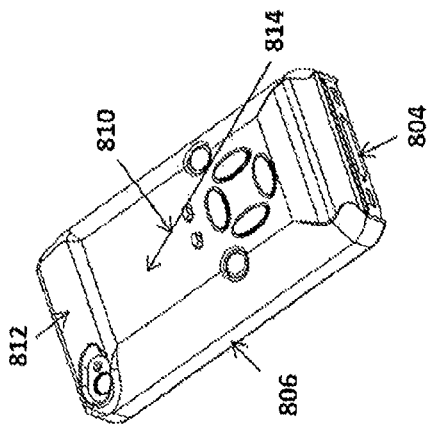
FIG. 11 is an orthogonal front view of an embodiment of the protective case in its environment show through front face an exemplary smartphone.

As shown in FIG. 8, another embodiment of a protective case 800 for a communications device, such as a smartphone, is sized to detachably connect to the smartphone while maintaining the functionality of the smartphone and to serve as protection for at least one other device, such as a satellite communication device, credit-card reader, or any other device. As shown in FIGS. 11 and 12, in one preferred embodiment generally has six primary faces. The five faces are the top face 802, bottom face 804, left face 806, right face 808, front face 807, and back face 810. As shown in FIG. 11, in one preferred embodiment substantially the front entire is open to allow for the face of the smartphone to be accessible while the smartphone is placed with protective case 800.

As shown in FIG. 11 and above with reference to FIG. 3, protective case 800 can be secured to the smartphone for example by lip 801. Lip 801 slightly extends from two or more faces such as top face 802, bottom face 804, left face 806, or right face 808 of protective case 800. The intersections of each of such face help secure a smartphone or other device by protective case 800. Any slight flexibility of the material from which the protective case 800 is made allows for the smartphone or other device to be snapped in and out of protective case 800 with minimal force, but exerts sufficient restraining force to prevent the smartphone from falling from the protective case 800 under its own weight or the magnitude of forces typically associated with normal operation of the smartphone. These constraints may guide the choice of construction materials. The length, height and width of each of the faces and protective case 800 can vary depending on the dimensions of the device with which the protective case 800 is to be used. In one embodiment, the smartphone is an IPHONE. Of course, other devices and smartphones can be used. Protective case 800 should be sized according to the dimensions of the smartphone or other device used.

In other embodiments, protective case 800 is convertible such that use of the satellite communications (or other) device is possible and convenient without securing protective case 800 to a smartphone. In such embodiments, top face 802, bottom face 804, left face 806, right face 808 are hingedly or otherwise suitably connected to back face 810. When protective case 800 is secured to a smartphone, top face 802, bottom face 804, left face 806, right face 808 are substantially perpendicular to back face 810. When a smartphone of this embodiment is removed from the protective case 800, top face 802, bottom face 804, left face 806, right face 808 rotate hingedly to lay flat against the satellite communications device on a plane perpendicular with back face 810. In such embodiments, each of the intersections between top face 802, bottom face 804, left face 806, right face 808 are arranged to allow such hinged rotation by, for instance, having a gap between the faces sufficient for rotation without any face blocking the motion of an adjacent face or being constructed of flexible material.

One or more apertures 816 may be disposed in the case 800 to allow access, to, for example, buttons or other controls. In one embodiment, an aperture 816 provides access for a camera lens mounted in an electronic device. The camera-lens aperture 816 may be sized to have a greater radius/circumference than that of the camera lens to thereby allow all or most of the light that would have struck the camera lens had the case 800 not be present to fall thereon. In various embodiments, the camera-lens aperture 816 increases in radius/circumference as the thickness of the case 800 (and/or components attached thereto) increases. For example, a cone may be imagined beginning at the camera lens and expanding outward with respect to the front face of the lens; the farther away from the lens, the greater the radius/circumference of the camera-lens aperture 816.

Figure 13:
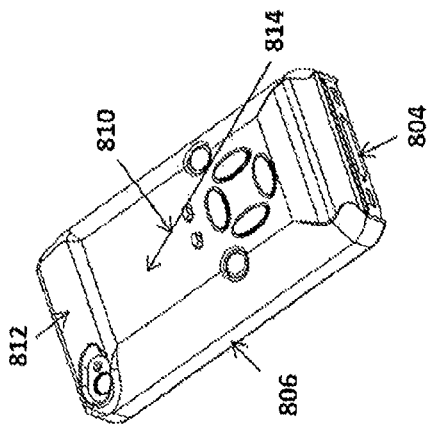
FIG. 13 is orthogonal view of the back of an embodiment of the protective case to highlight the formation of apertures by the case materials.
Figure 9:
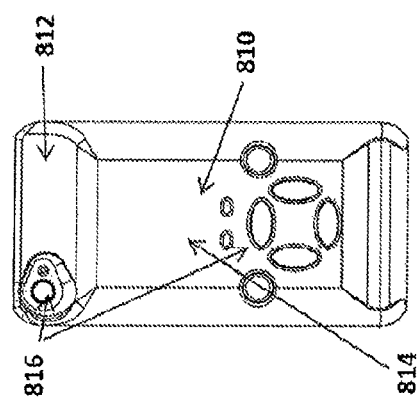
FIG. 9 is a back view of an embodiment of the protective case.

As shown in FIGS. 9, 12, and 13, back face 810 has an upper tier 812 and a lower tier 814. Upper tier 812 is arranged to create a space between the smartphone and protective case 800 for placement of a satellite communication or other device and a battery pack or other power source the satellite communication or other device. Back face 810 has windows 816 to allow for the functions from the back face of a smartphone or other device, (e. g., a camera) and for controls of the satellite communication or other device. As shown in FIG. 9, the windows of a preferred embodiment are arranged to allow functionality of, for example, a SPOT II SATELLITE GPS MESSENGER, with the communication module removed from its housing, and for the camera of the IPHONE. One or more of windows 816 may be covered by slides. The slides may serve as protection from accidentally accessing and/or protecting the functions (e.g., buttons, ports, and/or jacks) of the satellite communication device. The slides may be secured to protective case 800 by a backing that connects to the case. The slides can move to open and close windows 816.

The specific placement of the satellite communication device with respect to the protective case 800 allows for functionality of a smartphone and communications from a satellite communication device. The satellite communication device is secured to a protective case 800 by, for instance, one or more small screws into threaded holes in the protective case 800. In other embodiments, the satellite communication device could be attached to the protective case 800 by other means, including different fasteners or by a pre-formed construction enclosing the satellite communication device by a protective case 800. Attachments could be formed of Velcro materials and can be of the same color and material as case 800 or of different or contrasting colors or materials. Protective case 800 may be secure to a satellite communication device or to other device by magnetic means. There may be a magnets, including for example a magnetic plate substantially the same dimensions as bottom face 804 and securing magnetically to bottom face 804 to substantially share one to all four edges therewith. Such an arrangement can be used to secure protective case 800 containing a smartphone to a band around the arm of a user, for example, while the user jogs or exercises. The threaded holes may be arranged such that, when the satellite communication device is attached to protective case 800 and the smartphone is placed substantially within the protective case 800, a small space remains above the satellite patch antenna sufficient to prevent the detuning of the patch antenna. In such embodiments, using the IPHONE and the SPOT II SATELLITE GPS MESSENGER (or similar devices), the spacing is between about 1 mm and 3 mm in thickness. Further, the threaded holes and upper tier 812 may be arranged such that the satellite communication device is secured at a location that is above the area typically held by one's hand when on a phone call. This placement helps the functionality of the satellite communication device because the antenna of the satellite communication device will not detune due to the presence of a user's hand covering the antenna and thus causing degradation. With this placement, the patch antenna can be in a compact and convenient arrangement and function with minimal interference and without detuning. The compact design of protective case 800 allows for the use of a space-reducing antenna such as the patch antenna employed in the SPOT II SATELLITE GPS MESSENGER. Omnidirectional antennas, as the name implies, are designed to send and receive signals 360-degrees around the antenna, meaning that these antennas, also known as helical antennas, can receive signals from any direction. Semi-directional antennas, such as a patch antenna, send and receive signals in a 180-degree pattern and are therefore more focused in directing a signal than omnidirectional antennas, like the helical antenna. Larger antenna can be less practical. For example, a helical antenna embedded into the face of the protective case may be ineffective because the signal could be blocked by both the smartphone and the user's head when the phone was held up to the user's ear.

Satellite communications devices such as the SPOT CONNECT often locate a power source (generally battery cells) in a daughter board substantially parallel with and adjacent to a mother board. In one embodiment of protection case 800, the battery cells are located within protective case 800 adjacent to bottom face 804 and on a plane similar to that of the mother board of satellite communications device. Power is transmitted from the battery cells to the satellite communications device via a wired or other connection. In such arrangements, the thickness of the satellite communication device, as integrated into one embodiment of case 800, is substantially less than the thickness of the satellite communications device as it is commercially sold in its own housing. This allows one preferred embodiment to be thinner because the satellite communications device with its power source are arranged in a shape that closely mimics the shape of typical commercially available smartphones.

Figure 10:
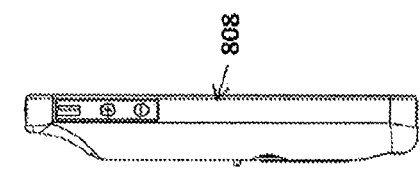
FIG. 10 is one side view of an embodiment of the protective case.

As shown in FIG. 10 and FIG. 11, top face 802, bottom face 804, left face 806, and right face 808 each may have holes to allow for the functionality of the smartphone. For example, as shown in FIG. 11, bottom face 804 has a hole such that a smartphone can attach to an electrical power source, the right face 808 has a hole to allow access to a volume button and top face 802 has a hole to allow access to an earphone jack or power button. Of course, these holes can be differently placed depending on the configuration of the intended smartphone to be used. The protective case 800 can be modified to carry a variety of different communication devices while still allowing for the operability of a smartphone or other device. For example, protective case 800 can be modified for use with a satellite telephone or a terrestrial telephone (if, e.g., a user has one phone for business use and another for personal use). Further, protective case 800 can be used with two communication devices that allow for inter-communication between the devices. For another example, a satellite communication device can be the SPOT CONNECT, which enables connection by BLUETOOTH to a smartphone. Thus, protective case 800 is extremely versatile and allows for convenient methods to communicate certain messages from a smartphone, which is traditionally not capable of communication through the satellite path, via satellite. In each arrangement, protective case 800 should secure a communication device such that the patch antenna is located at a position that does not detune and that no contact occurs between the smartphone housing and the other chosen satellite communication device.

Figure 14:
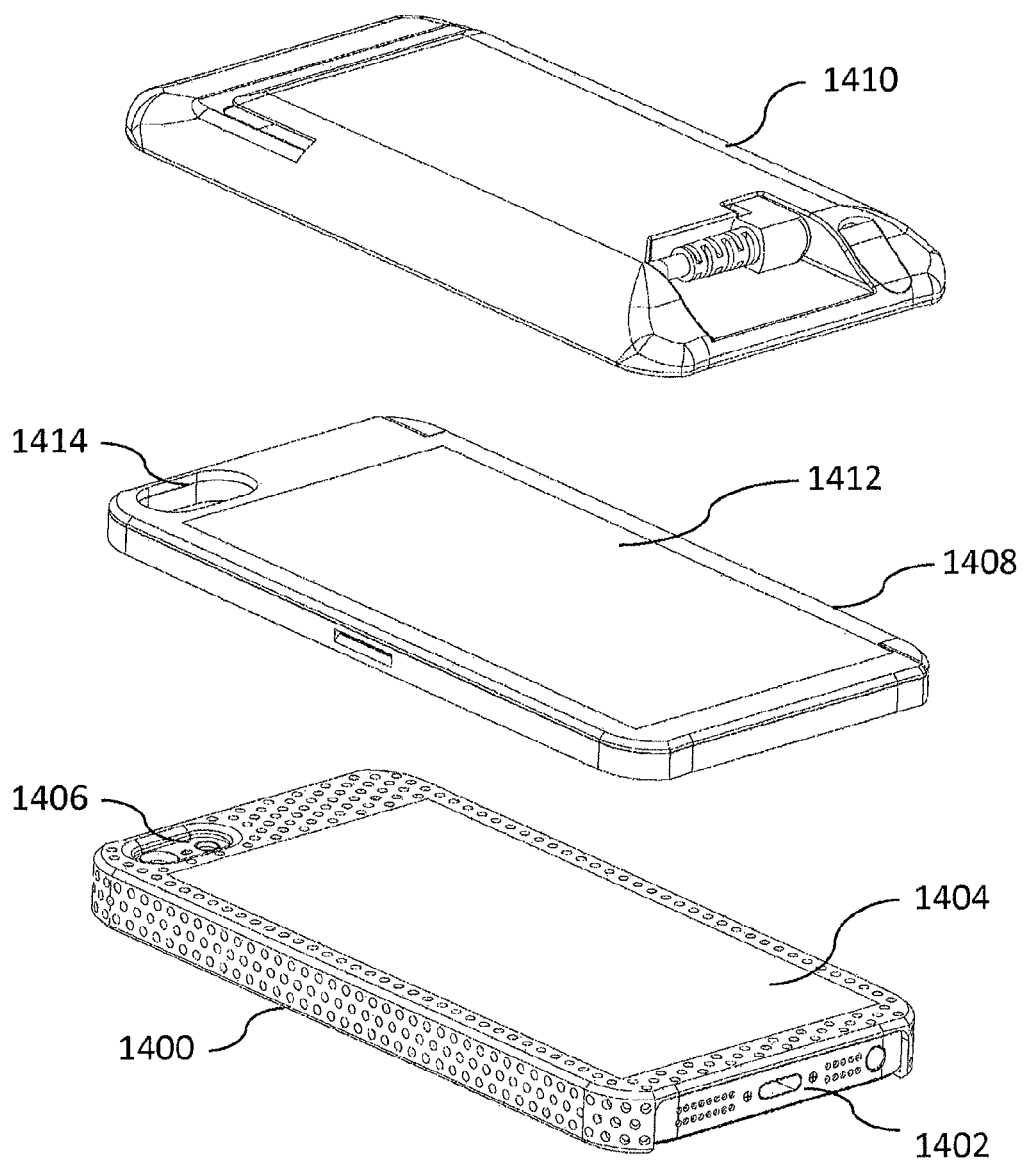
FIG. 14 is an orthogonal view of an embodiment of the mobile device case with multiple attachable articles.

In various embodiments, more than one article or device may be attached to or stacked on a case for an electronic device. FIG. 14 illustrates a smartphone case 1400 attached to a smartphone 1402. As described above, a face 1404 of the case 1400 may include a magnet or magnets and an aperture 1406 for a camera lens disposed in the smartphone 1402. A first article 1408 attaches to the face 1404 of the case 1400 via the magnetic force exerted between one or more magnets in the first article 1408 and the one or more magnets in the case 1400. A second article 1410 may be attached to a face 1412 of the first article 1408. The second article 1410 also includes one or more magnets; these magnets create a magnetic force, sufficient to attach the second article 1410 to the first article 1408, relative to magnets in the first article 1408 (which may be the same or different magnets used to attach the first article 1408 to the case 1400) and/or magnets in the case 1400.

In this embodiment, the first article 1408 is a storage article for storing, e.g., a credit card and/or key, and the second article 1410 is a credit-card reader. The present invention is not limited to any particular kind of first 1408 and second 1410 articles, however, and any combination or type of articles is within the scope of the present invention. The second article 1410 may be, for example, a decorative plate. In one embodiment, the outer face 1412 of the first article 1408 may include a design, photo, logo, or other embellishment that is presented when only the first article 1408 (and not the second article 1410) is attached to the case 1400.

In various embodiments, the first article 1408 is specially designed to receive the second article 1410; in other embodiments, the second article 1410 attaches to the first article 1408 without any special design. For example, the first article 1408 may be designed to have additional magnets and/or mechanical guides (grooves, ridges, posts, divots, lips, etc.) to facilitate attachment of the second article 1410; on the other hand, especially if the first article 1408 is thin and/or the magnets in the case 1400 are strong enough, the second article 1410 may be attached to the first article 1408 without any of these additional features.

Similarly, the second article 1410 may be designed to specifically be attached to the first article 1408; in other embodiments, the case 1400 and the first article 1408 have similar properties (e.g., magnet strength, position, grooves, ridges, lips, etc.) such that that second article 1410 attaches similarly to both the case 1400 and the first article 1408.

In various embodiments, the articles 1408, 1410 include features to allow access to, operate, or otherwise use functions of the electronic device. For example, the first article may include an aperture 1414 to allow access to a camera lens on the smartphone (via the aperture 1406 on the case 1400). As described above, the aperture 1414 on the first article 1408 may be larger in radius/circumference than the aperture 1406 on the case 1400; an aperture (not shown) on the second article 1410 is larger still.

Figure 15:
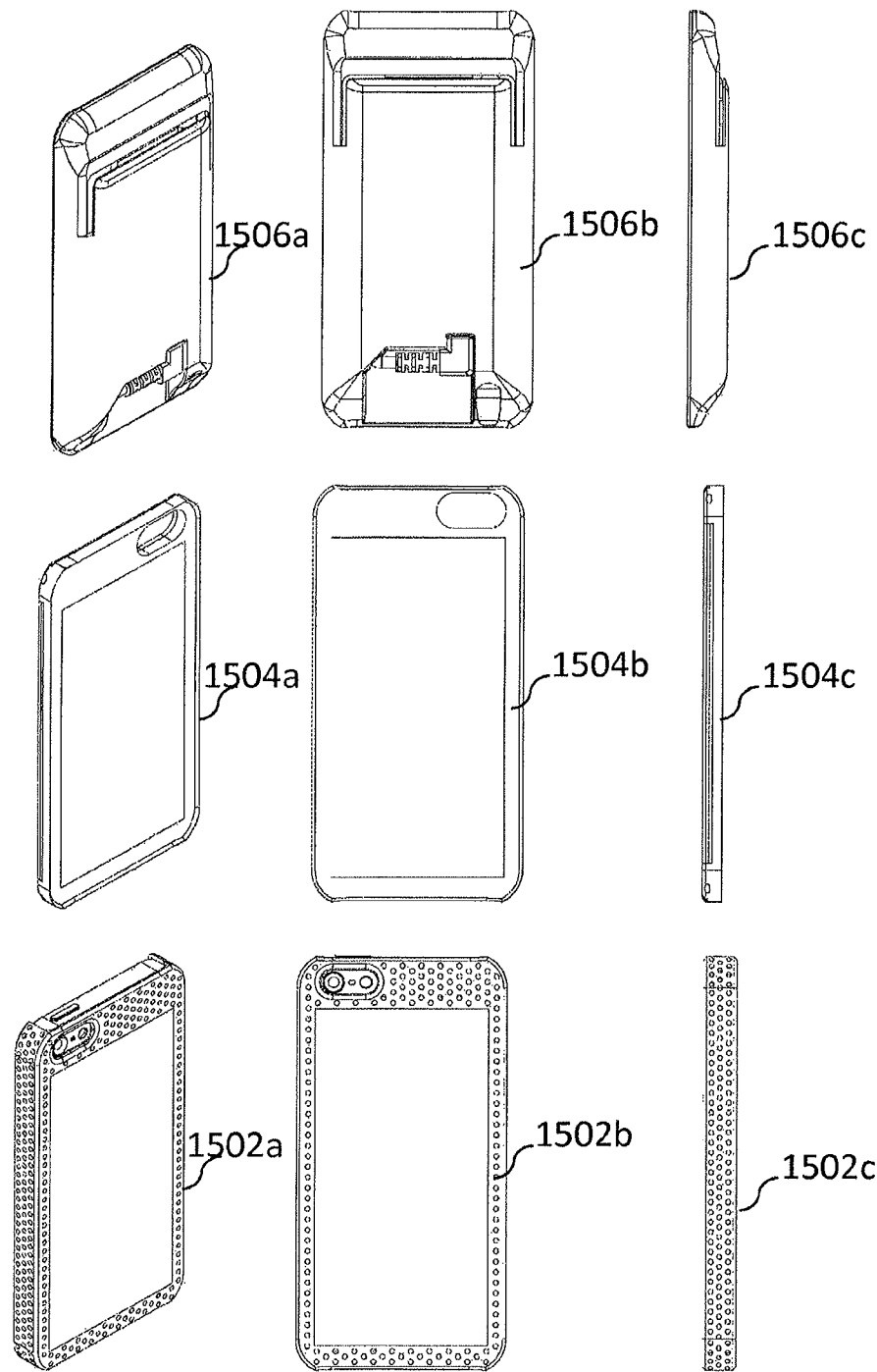
FIG. 15 is a plurality of views of an embodiment of the mobile device case with multiple attachable articles.

FIG. 15 illustrates angle 1502*a*, front 1502*b*, and side 1502*c* views of the case 1400; angle 1504*a*, front 1504*b*, and side 1504*c* views of the first article 1408; and angle 1506*a*, front 1506*b*, and side 1506*c* views of the second article 1410.

Figure 16:
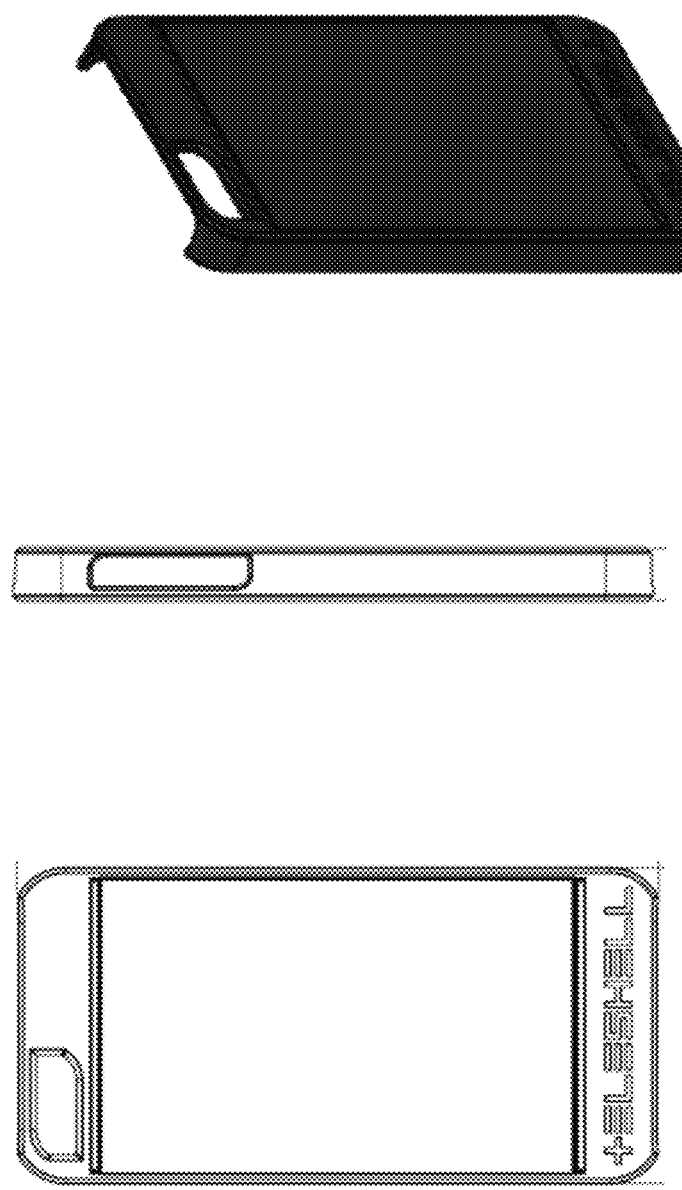
FIG. 16 is a plurality of views of a protective case having a camera aperture.

FIGS. 16 and 17 illustrate multiple views and angles of cellular phone attachments that mechanically attach to a cellular phone. The attachment of FIG. 16 includes an aperture to permit a camera disposed on the phone to receive external light input; the attachment of FIG. 17 is a wallet case attachment and does not include such an aperture. As discussed above, each attachment may include a magnet on its back face capable of receiving one or more additional magnetic attachments, as discussed further elsewhere.

FIG. 18 illustrates an attachment that includes a credit-card reader capable of reading magnetic information encoded on a magnetic strip on a credit card (or similar card, such as a gift card or rewards card). The attachment includes a slot through which a credit card may be passed and its information read; the attachment further includes a jack (having an attached cable) for attachment to a data port of the cellular phone, such as an audio port or USB port. The credit-card reader may instead or in addition communicate wirelessly with the cellular phone via BLUETOOTH, WI-FI, or similar protocol. The credit-card reader may additionally include circuitry, memory, or similar active components to support the reading of the credit card. The credit-card reader may include its own power source (e.g., a rechargeable battery) or may draw power from the cellular phone via the jack.

FIG. 19 illustrates a battery-pack attachment for magnetically attaching to the mechanically-attached attachment described above. The battery pack includes a power-output jack for connecting to a charging port of the cellular phone, such as a USB port or a proprietary power-port interface. The battery-pack attachment may further include additional ports for the charging of the internal battery. In other embodiments, the attachment has a magnetic back so that items (e.g., a phone case and a pouch attachment) may be attachable to both sides.

FIG. 20 illustrates a pouch attachment for magnetically attaching to the mechanically-attached attachment described above. The pouch attachment includes a pouch for receiving items, such as credit cards, ID cards, food items (such as packs of gum or mints), or any other such items. The pouch attachment may further include a camera aperture.

Figure 21:
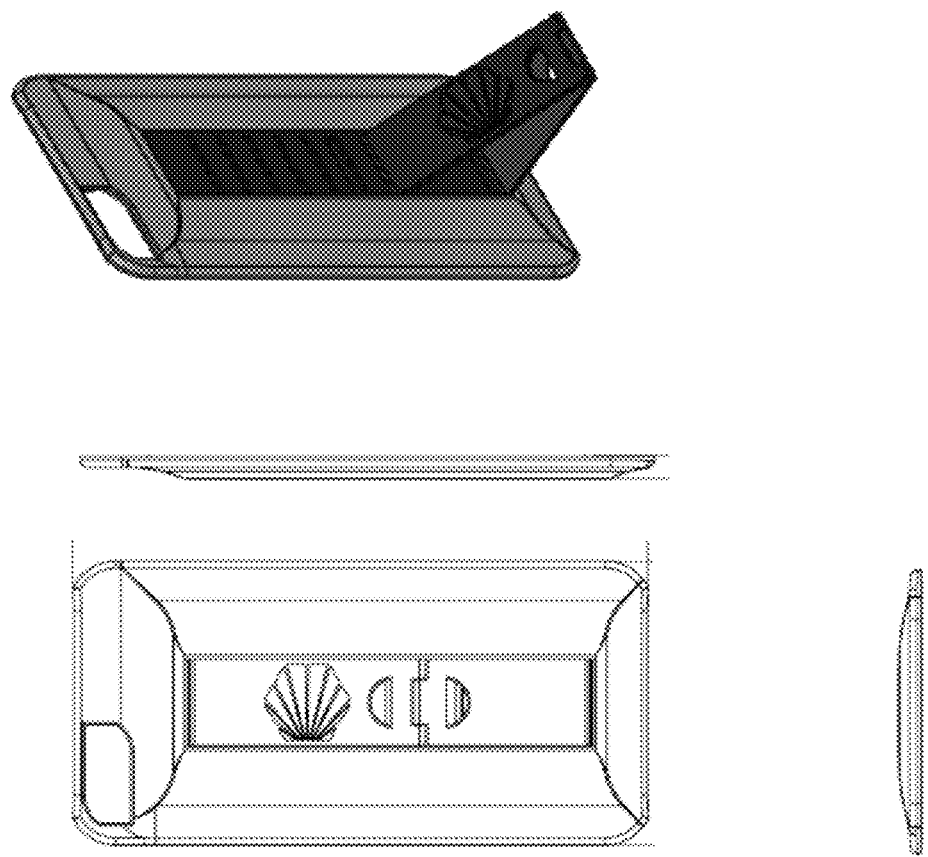
FIG. 21 is a plurality of views of a kickstand attachment.

FIG. 21 illustrates a kickstand attachment for magnetically attaching to the mechanically-attached attachment described above. The kickstand attachment includes a hinged member having a fixed end and a slidably attached end. The hinged member may be folded flat against the kickstand attachment when not in use. When in use, the hinged member may be folded out, and the slidably attached end may be snapped in place (via mechanical friction) in one of a variety of positions, thereby allowing the cellular phone to rest in one of a variety of angles with respect to a surface receiving the phone. The phone may be thusly held up at the angle by the hinged member and a short side of the phone or the hinged member and a long side of the phone.

Figure 22:
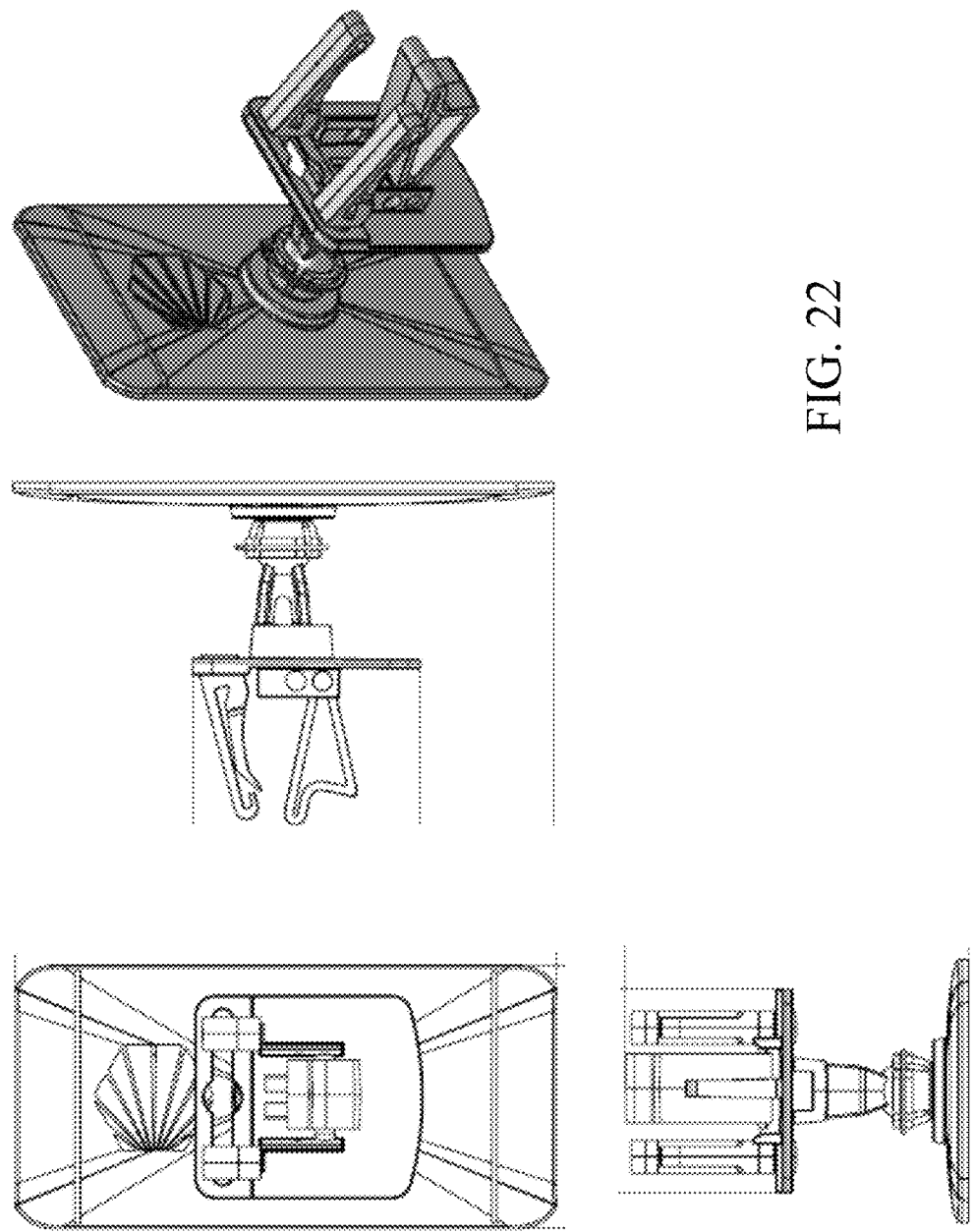
FIG. 22 is a plurality of views of a car holder attachment.

FIG. 22 illustrates a car-mount attachment for magnetically attaching to the mechanically-attached attachment described above. The car-mount attachment may also secure any of the other items in the other figures. The car-mount attachment includes a first component for attaching to the phone and a second component for attaching to a heating/cooling vent in an automobile; the components may be connected via any means, such as by a ball-and-socket joint. In one embodiment, the components may be connected or separated by applying force toward or away from the ball-and-socket joint. The second attachment component may include first members for hooking onto a fin of the heating/cooling vent and a second member for resting against another fin to thereby support the second component and attachments/phone. The car-mount attachment may alternatively be attached to any other device or component having at least one fin and is not limited to only automobile attachment.

FIG. 23 illustrates a loop-and-sling for mechanically attaching to a cellular phone. The loop-and-sling attachment includes one or more loops mechanically attached to a surface of the attachment; these loops may be used together with a string, strap, cord, or other similar item to create a carrying sling for the phone and attachment. For example, one loop may be attached to a lanyard or necklace, and the phone and attachment may be slung around a wearer's neck. In another embodiment, two loops may be attached to a cord, and the phone and attachment may be slung over a wearer's shoulder like a small bag or purse. In one embodiment, the loops are slidably attached to the loop-and-sling attachment and may be slid out such that the cord may be attached or slid in such that they do not protrude from an external surface of the attachment (e.g., for when the loops are not in use). The loop-and-sling attachment may further include a camera aperture and a magnetic back surface for receiving additional attachments.

Figure 25:
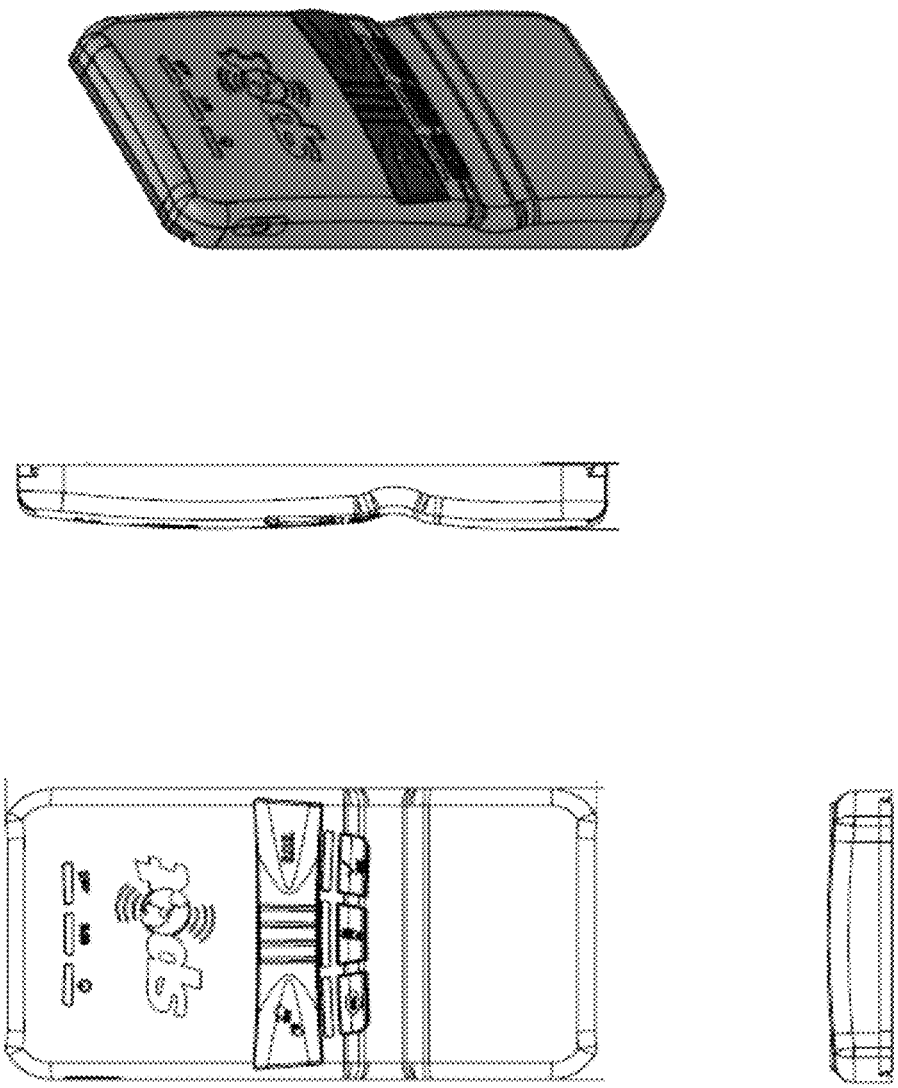

FIGS. 24 and 25 illustrate satellite-transceiver attachments for magnetically attaching to the mechanically-attached attachment described above. The satellite transceivers may include circuitry and antennas for communicating with satellites, such as satellites used for phone communication, text messaging, Internet connectivity, or radio communication. The transceivers may further include circuitry for communicating with the phone, such as wireless or wired data connectors, and external buttons with which a user may control the transceiver.

FIGS. 26 and 27 illustrate alternative decorative attachments for magnetically attaching to the mechanically-attached attachment described above. The decorative attachments may include a camera aperture and may be adorned with a variety of different patterns, such as the "carbon-fiber" pattern of FIG. 27. Any other patterns, designs, logos, or colors are within the scope of the present invention. This attachment my include a recessed area that may mimic the shape of the attachment to thereby permit a veneer, such as a thin piece of carbon fiber, to be adhesively placed/secured. A raised lip outlines this recess/veneer so that the outer surfaces/edges are smooth and protected on all sides. FIG. 26 is rounded plastic without a recess, similar to the magnetic and steel plates that are recessed in the back of the cases and attachments.

FIG. 28 illustrates a shoulder-rest attachment for magnetically attaching to the mechanically-attached attachment described above. The shoulder-rest attachment includes a first component for attaching to the phone and a second component for resting on a shoulder of a user; the components may be connected via any means, such as by a ball-and-socket joint. The second component may be detached from the first for storage or carrying; other components, such as the car-attachment component described above, may be inserted into the socket of the ball-and-socket joint in place of the shoulder-rest attachment. A user may use the shoulder-rest attachment for hands-free use of the phone by cradling the phone-and-shoulder-rest combination between his or her ear and shoulder.

FIG. 29 illustrates an ear-bud-holder attachment for magnetically attaching to the mechanically-attached attachment described above. The ear-bud holder may include an internal compartment for receiving a pair of ear-bud headphone buds; the internal compartment may be accessed by opening a hinged door or sliding a slidable door (or by any other means). A user may then wind the cords of the ear-bud headphones around a flanged area of the holder such that the wound cords are held by friction between a back plate of the holder and a flanged protrusion of the holder. In one embodiment, the internal compartment is further configured to receive the jack of the ear-bud headphones once the cord is completely wound around the flanged area. The internal compartment may include a plurality of openings for allowing the cord to pass therethrough, to allow both the portion of the cord nearest the buds and the portion of the cord nearest the jack to pass in and out of the internal compartment. The openings may be accessible for placement of the cord therethrough while the door is open, and when the door is closed, the cord may be held in place thereby.

Figure 30:
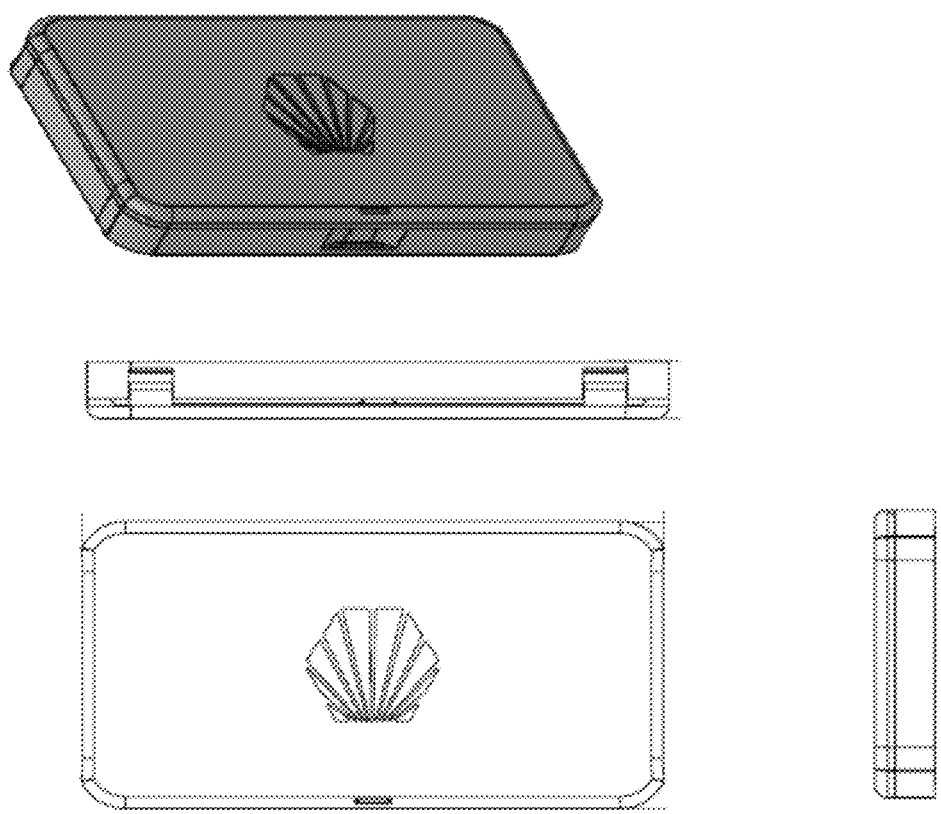
Figure 33:
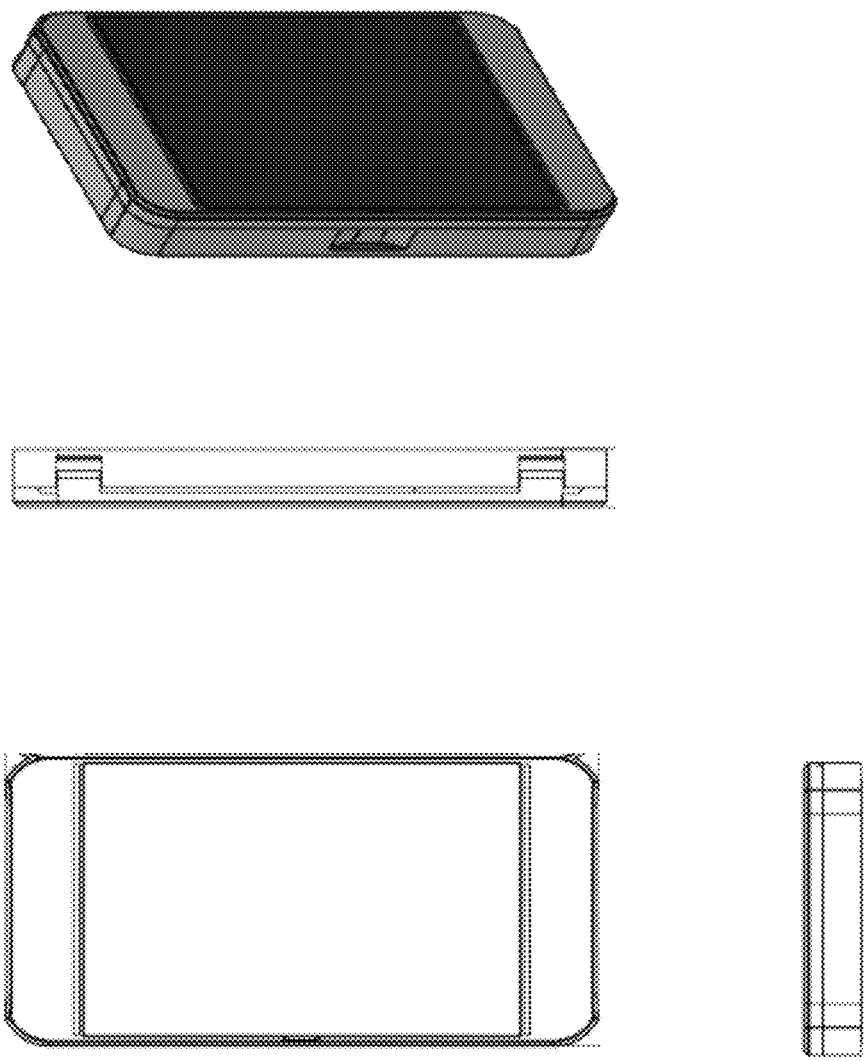
Figure 34:
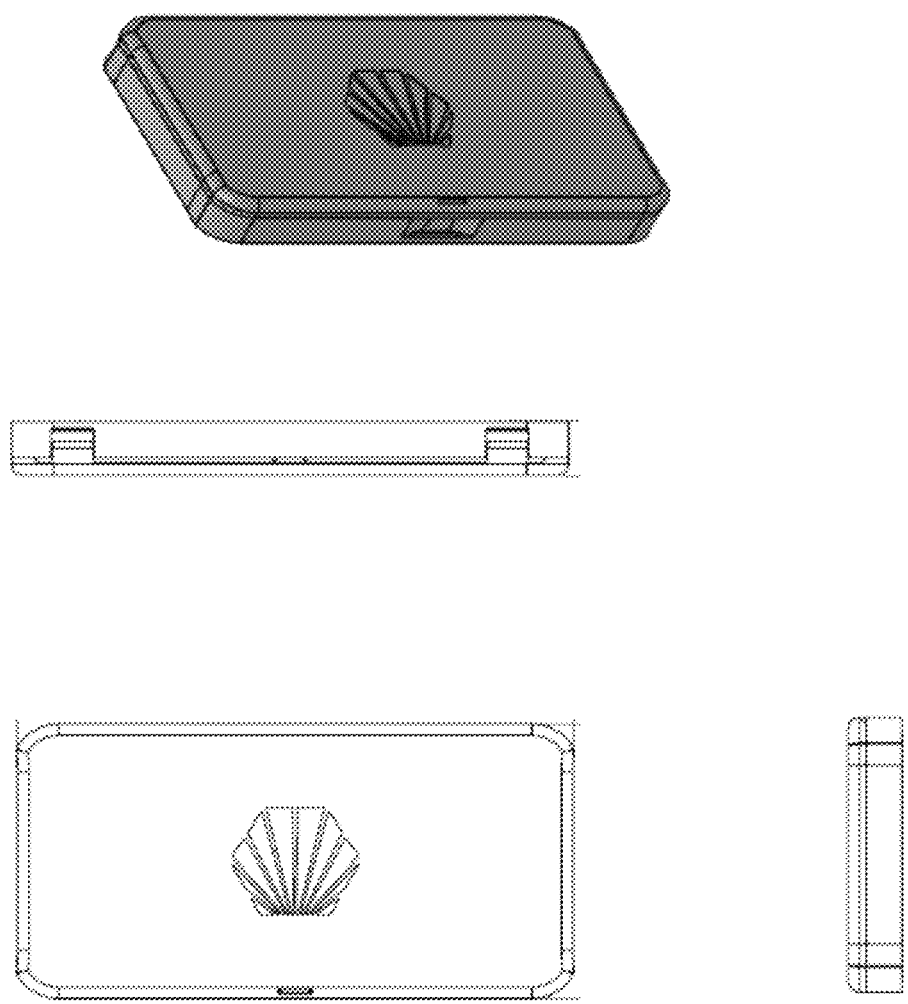

FIGS. 30-35 illustrate a variety of case attachments for magnetically attaching to the mechanically-attached attachment described above, each case having a hinged or slidable door for access to an internal compartment within the case. In one embodiment, as shown in FIG. 30, the internal compartment includes an accordion-style organizer that expands when the door is open; the organizer may be used to receive one or more items, such as credit cards or ID cards. In another embodiment, as shown in FIG. 31, the internal compartment comprises a plurality of separator members for creating a plurality of sub-compartments. In one embodiment, as shown, the separator members are arranged in a grid; the members may be arranged in any fashion, however. The members may be removable and replaceable by the user (held to the compartment walls by, for example, friction). The user may thus customize the size and placement of the sub-compartments in accordance with his or her needs. For example, the user may configure a larger sub-compartment to receive one or more credit cards and a smaller sub-compartment to receive a key. An external face of the case (i.e., facing away from the phone) may include a decorative shell or another magnet to which another attachment may be attached.

In some embodiments, the attachments use a rubberized steel plate that allow them to attach seamlessly to magnetized plates found on the cases (regular and looped) as well as the car-mount. If the attachments have magnetized plates too, then the polarity of the magnets may not match up perfectly and, instead, be skewed slightly, thereby preventing the articles from being connected with flush outer edges. The rubberized steel allows for an exact fit and clean/smooth edge all the way around. Also, magnetic sheets may be used on the outwardly facing faces of the attachments that allow for other attachments to stack on top by means of rubberized steel.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not expressed herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A protective case configured to receive a mobile device and to attach to an article, the protective case comprising:
   a front face being substantially open to allow access to a front surface of the mobile device when the mobile device is placed within the protective case;
   a back face having an interior surface and an exterior surface, the interior surface of the back face being in touch with a back surface of the mobile device when the mobile device is placed within the protective case; and
   a back plate having an interior surface and an exterior surface, the interior surface of the back plate being detachably attached to the exterior surface of the back face and the exterior surface of the back plate being detachably attached to the article when the protective case is attached to the article,
   wherein the article comprises a satellite communication device comprising a patch antenna, and
   wherein the satellite communication device is positioned relative to the mobile device to substantially prevent detuning of the patch antenna when the mobile device and the satellite communication device are active.

2. The protective case of claim 1, wherein the exterior surface of the back plate is magnetically attached to the article when the protective case is attached to the article.

3. The protective case of claim 2, wherein the back plate of the protective case comprises at least one magnet and the article comprises a steel plate for magnetically coupling to the at least one magnet of the back plate of the protective case.

4. The protective case of claim 1, wherein the mobile device comprises one or more of: a cellular phone, smartphone, tablet computer, and laptop.

5. The protective case of claim 1, wherein the back plate of the protective case is removable from the protective case and interchangeable with another back plate.

6. The protective case of claim 1, wherein the article comprises at least one of: a satellite communicator, a pouch, a kickstand, an ear-bud holder, a shoulder support, a car-mount holder, a credit-card reader, a battery, a compartment for storage of a key or credit card, and a decorative attachment.

7. The protective case of claim 1, wherein the article comprises a connecting means configured to connect to a data port of the mobile device.

8. The protective case of claim 1, wherein the article is configured to wirelessly communicate with the mobile device.

9. The protective case of claim 1, wherein the article comprises a means configured to draw power from the mobile device.

10. The protective case of claim 1, further comprising at least one loop for attaching a cord thereto.

11. The protective case of claim 10, wherein the at least one loop is configured to slide in and out of the protective case.

12. The protective case of claim 1, wherein the article comprises an accordion-style organizer.

13. The protective case of claim 1, wherein the article comprises a compartment comprising a plurality of removable members for creating a plurality of sub-compartments therein.

14. The protective case of claim 1, wherein the article comprises a ball-and-socket joint.

15. The protective case of claim 1, further comprising a mechanical means for preventing the mobile device and the article from sliding relative to each other.

16. The protective case of claim 15, wherein the mechanical means comprises one or more of: a lip, groove, trench, stud, and divot.

17. The protective case of claim 1, wherein the back plate of the protective case comprises an aperture for allowing light to strike a portion of the back surface of the mobile device.

18. The protective case of claim 17, wherein the aperture in the back plate aligns with a corresponding aperture in the back face of the protective case and another corresponding aperture in the article.

19. The protective case of claim 1, wherein:
the back face of the protective case comprises an aperture for allowing access to a docking port disposed in or on the mobile device; and
the article is detached from the protective case to permit docking.

20. the protective case of claim 1, wherein components of the article are disposed in a plane parallel to the back plate.

* * * * *